US012676154B2

(12) United States Patent
Zhu

(10) Patent No.: US 12,676,154 B2
(45) Date of Patent: Jul. 7, 2026

(54) AUDIO PROCESSING METHOD AND APPARATUS, DEVICE, READABLE STORAGE MEDIUM, AND PROGRAM PRODUCT

(71) Applicant: Tencent Technology (Shenzhen) Company Limited, Shenzhen (CN)

(72) Inventor: Hongning Zhu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 150 days.

(21) Appl. No.: 18/583,688

(22) Filed: Feb. 21, 2024

(65) Prior Publication Data

US 2024/0242722 A1     Jul. 18, 2024

Related U.S. Application Data

(63) Continuation of application No. PCT/CN2023/114040, filed on Aug. 21, 2023.

(30) Foreign Application Priority Data

Sep. 7, 2022     (CN) .......................... 202211088204.6

(51) Int. Cl.
G06F 16/65          (2019.01)
G10L 17/02          (2013.01)
G10L 17/06          (2013.01)

(52) U.S. Cl.
CPC .............. G10L 17/06 (2013.01); G06F 16/65 (2019.01); G10L 17/02 (2013.01)

(58) Field of Classification Search
None
See application file for complete search history.

(56) References Cited

U.S. PATENT DOCUMENTS

2014/0358541 A1* 12/2014 Colibro ................. G10L 15/063
                                                                    704/245
2018/0082689 A1*  3/2018 Khoury ................... G10L 17/00
                        (Continued)

FOREIGN PATENT DOCUMENTS

CN          108908377 A     11/2018
CN          110337030 A     10/2019
                        (Continued)

OTHER PUBLICATIONS

Tencent Technology, ISR, PCT/CN2023/114040, Nov. 10, 2023, 2 pgs.

(Continued)

*Primary Examiner* — Jakieda R Jackson
(74) *Attorney, Agent, or Firm* — Morgan, Lewis & Bockius LLP

(57)          ABSTRACT

In the field of computer technologies, an audio processing method and apparatus, a device, a readable storage medium, and a program product are provided. The method includes: determining a voiceprint vector corresponding to each of a plurality of audio segments; determining an initial similarity matrix according to the voiceprint vector corresponding to each audio segment, the initial similarity matrix including a similarity between voiceprint vectors corresponding to any two audio segments; adjusting the initial similarity matrix according to a dynamic threshold corresponding to each row of the initial similarity matrix to obtain a reference similarity matrix; and determining, according to the reference similarity matrix, a quantity of audio objects corresponding to the plurality of audio segments.

11 Claims, 6 Drawing Sheets

(56) References Cited

U.S. PATENT DOCUMENTS

| | | | | |
|---|---|---|---|---|
| 2022/0182485 A1* | 6/2022 | Frenkel | .............. | H04M 3/2281 |
| 2022/0254349 A1* | 8/2022 | Guo | ........................ | G10L 25/18 |
| 2022/0254350 A1* | 8/2022 | Guo | ........................ | G10L 17/02 |

FOREIGN PATENT DOCUMENTS

| | | |
|---|---|---|
| CN | 112133319 A | 12/2020 |
| CN | 113327628 A | 8/2021 |
| CN | 113724739 A | 11/2021 |
| CN | 114446284 A | 5/2022 |
| CN | 114512135 A | 5/2022 |
| CN | 114822558 A | 7/2022 |
| CN | 114937462 A | 8/2022 |
| CN | 115168643 A | 10/2022 |
| WO | WO 2019085575 A1 | 5/2019 |
| WO | WO 2020098083 | 5/2020 |
| WO | WO 2021072893 | 4/2021 |
| WO | WO 2022022152 | 2/2022 |
| WO | WO 2022161264 | 8/2022 |

OTHER PUBLICATIONS

Jiacheng Yao et al., "Anchor Voiceprint Recognition in Live Streaming Via RawNet-SA and Gated Recurrent Unit", EURASIP Journal on Audio, Speech, and Music Processing, vol. 2021, Article No. 45, DOI: 10.1186/s13636-021-00234-3, Dec. 2021, 18 pgs.

Xudong Li et al., "Adaptive Threshold Estimation of Open Set Voiceprint Recognition Based on OTSU and Deep Learning", Journal of Applied Mathematics and Physics, vol. 8, No. 11, DOI: 10.4236/jamp.2020.811197, Nov. 2022, 12 pgs.

Yuan Ping et al., "Feature Fusion and Voiceprint-Based Access Control for Wireless Insulin Pump Systems", IEEE Access, vol. 7, DOI: 10,1109/ACCESS.2019.2937805, Aug. 2019, 17 pgs.

Tencent Technology, Extended European Search Report, EP Patent Application No. 23862178.3, Sep. 29, 2025.

Hongjie Jia et al., "The Latest Research Progress on Spectral Clustering", Springer, Neural Computing and Applications, vol. 24, Jun. 2013, 10 pgs.

Quan Wang et al., "Speaker Diarization with LSTM", 2018 IEEE International Conference on Acoustics, Speech and Signal Processing (ICASSP), Apr. 2018, 5.

Wei Xia et al., "Turn-to-Diarize: Online Speaker Diarization Constrained by Transformer Transducer Speaker Turn Detection", 2022 IEEE International Conference on Acoustics, Speech and Signal Processing (ICASSP), Jan. 2022, 8 pgs.

* cited by examiner

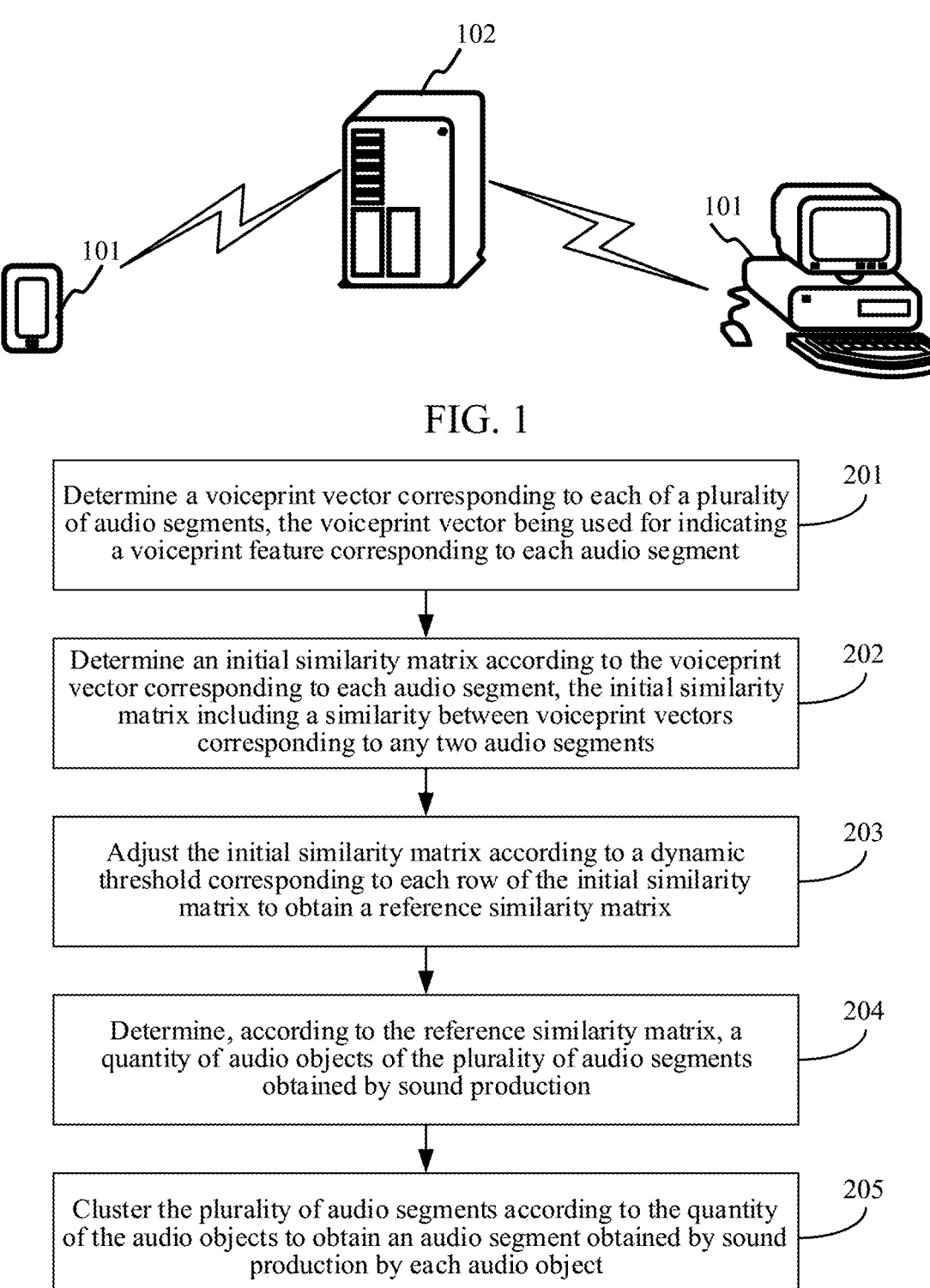

FIG. 1

Determine a voiceprint vector corresponding to each of a plurality of audio segments, the voiceprint vector being used for indicating a voiceprint feature corresponding to each audio segment          201

Determine an initial similarity matrix according to the voiceprint vector corresponding to each audio segment, the initial similarity matrix including a similarity between voiceprint vectors corresponding to any two audio segments          202

Adjust the initial similarity matrix according to a dynamic threshold corresponding to each row of the initial similarity matrix to obtain a reference similarity matrix          203

Determine, according to the reference similarity matrix, a quantity of audio objects of the plurality of audio segments obtained by sound production          204

Cluster the plurality of audio segments according to the quantity of the audio objects to obtain an audio segment obtained by sound production by each audio object          205

FIG. 2

AUDIO PROCESSING METHOD AND APPARATUS, DEVICE, READABLE STORAGE MEDIUM, AND PROGRAM PRODUCT

CROSS-REFERENCE TO RELATED APPLICATIONS

This application is a continuation application of PCT Patent Application No. PCT/CN2023/114040, entitled "AUDIO PROCESSING METHOD AND APPARATUS, DEVICE, READABLE STORAGE MEDIUM, AND PROGRAM PRODUCT" filed on Aug. 21, 2023, which claims priority to Chinese Patent Application No. 202211088204.6, entitled "AUDIO PROCESSING METHOD AND APPARATUS, DEVICE, AND COMPUTER-READABLE STORAGE MEDIUM" filed on Sep. 7, 2022, all of which is incorporated herein by reference in its entirety.

FIELD OF THE TECHNOLOGY

Embodiments of this application relate to the field of computer technologies, and in particular, to an audio processing method and apparatus, a device, a readable storage medium, and a program product.

BACKGROUND OF THE DISCLOSURE

The continuous development of computer technologies has led to increasing audio processing methods. For example, audio object clustering is an audio processing method. The audio object clustering is to determine a quantity of audio objects included in a plurality of audio segments and an audio segment corresponding to each audio object.

In related art, a plurality of audio segments are obtained. A voiceprint vector corresponding to each audio segment is determined. A quantity of audio objects in the plurality of audio segments is determined according to similarities between the voiceprint vectors. The plurality of audio segments are clustered according to the quantity of the audio objects to obtain an audio segment corresponding to each audio object.

However, because the audio segments are obtained by a recording device, when recording devices as well as tones and moods of an audio object are different, timbre deviation of the audio object may be caused, and an environment where the audio object is in causes interference for determination of the voiceprint vector. Consequently, the determined voiceprint vector is inaccurate, resulting in low accuracy of audio object clustering and a poor audio processing effect.

SUMMARY

Embodiments of this application provide an audio processing method and apparatus, a device, a readable storage medium, and a program product, to improve accuracy of audio object clustering.

According to an aspect, an embodiment of this application provides an audio processing method, performed by a computer device, the method including:

determining a voiceprint vector corresponding to each of a plurality of audio segments;

determining an initial similarity matrix according to the voiceprint vector corresponding to the plurality of audio segments, the initial similarity matrix including a similarity between voiceprint vectors corresponding to any two audio segments;

adjusting the initial similarity matrix according to a dynamic threshold corresponding to each row of the initial similarity matrix to obtain a reference similarity matrix; and determining, according to the reference similarity matrix, a quantity of audio objects corresponding to the plurality of audio segments.

According to another aspect, an embodiment of this application provides a computer device, including a processor and a memory, the memory having at least one program code stored therein, and the at least one program code being loaded and executed by the processor to enable the computer device to implement any one of the foregoing audio processing method.

According to another aspect, a non-transitory computer-readable storage medium is further provided, having at least one program code stored thereon, the at least one program code being loaded and executed by a processor of a computer device to enable the computer device to implement any one of the foregoing audio processing method.

The technical solutions provided in the embodiments of this application at least have the following beneficial effects:

An initial similarity matrix is adjusted according to a dynamic threshold corresponding to each row of an initial similarity matrix to obtain a reference similarity matrix. In this way, through a dynamic threshold adjustment process, similarities between voiceprint vectors of audio segments of a same audio object increase and similarities between voiceprint vectors of audio segments of different audio objects decrease, so that a quantity of audio objects determined according to the reference similarity matrix is more accurate. In addition, a plurality of audio segments are clustered according to the quantity of the audio objects with higher accuracy to obtain an audio segment corresponding to each audio object. In this way, accuracy of the determined audio segment corresponding to each audio object is higher, and accuracy of clustering the audio object is higher, so that an audio processing effect on the audio segment can be improved.

BRIEF DESCRIPTION OF THE DRAWINGS

FIG. 1 is a schematic diagram of an implementation environment of an audio processing method according to an embodiment of this application.

FIG. 2 is a flowchart of an audio processing method according to an embodiment of this application.

DESCRIPTION OF EMBODIMENTS

Figure 3:
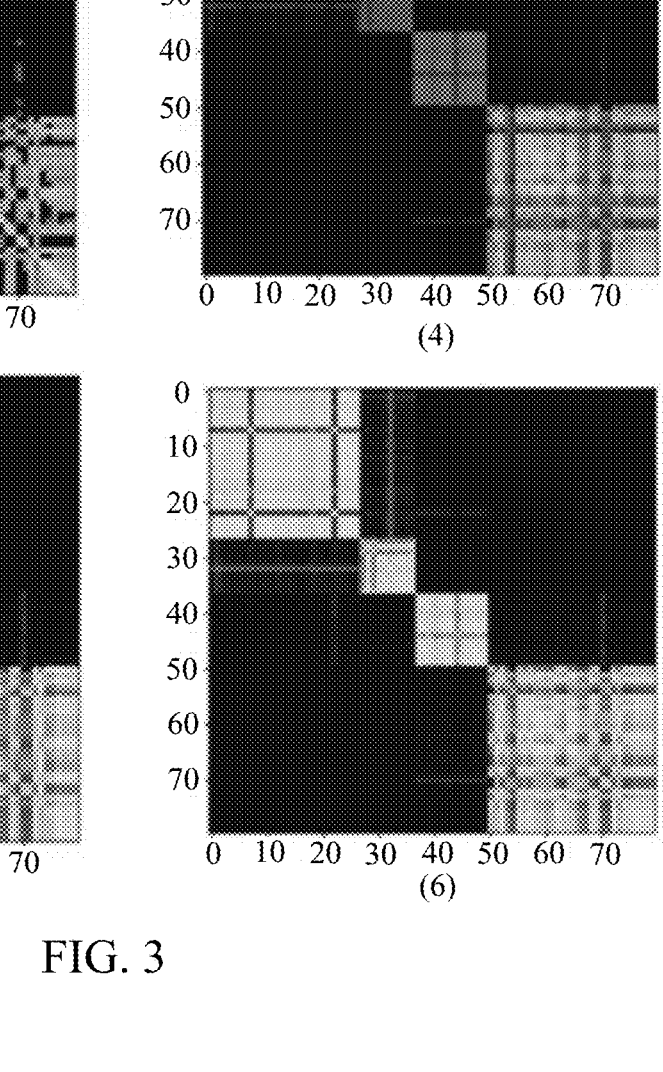
FIG. 3 is a schematic diagram of a process of determining a similarity matrix according to an embodiment of this application.

In exemplary embodiments, an audio processing method provided in the embodiments of this application may be applied in various scenarios, including but not limited to cloud technologies, artificial intelligence, smart transportation, assisted driving, games, and the like.

Artificial intelligence (AI) is a theory, method, technology, and application system that uses a digital computer or a machine controlled by the digital computer to simulate, extend, and expand human intelligence, perceive an environment, acquire knowledge, and use knowledge to obtain an optimal result. In other words, artificial intelligence is a comprehensive technology in computer science and attempts to understand the essence of intelligence and produce a new intelligent machine that can react in a manner similar to human intelligence. Artificial intelligence is to study design principles and implementation methods of various intelligent machines, to enable the machines to have functions of perception, reasoning, and decision-making.

The solutions provided in the embodiments of this application relate machine learning (ML) technologies in artificial intelligence technologies. Machine learning is a multi-field interdiscipline, and relates to a plurality of disciplines such as the probability theory, statistics, the approximation theory, convex analysis, and the algorithm complexity theory. Machine learning specializes in studying how a computer simulates or implements a human learning behavior to obtain new knowledge or skills, and reorganize an existing knowledge structure, so as to keep improving its performance. Machine learning, as the core of artificial intelligence, is a basic way to make the computer intelligent, and is applied to various fields of artificial intelligence. Machine learning and deep learning generally include technologies such as an artificial neural network, a belief network, reinforcement learning, transfer learning, inductive learning, and learning from demonstrations.

With the research and progress of artificial intelligence technologies, the artificial intelligence technologies is studied and applied in a plurality of fields such as common smart homes, smart wearable devices, virtual assistants, smart speakers, smart marketing, self-driving, autonomous driving, unmanned aerial vehicles, robots, smart medical care, smart customer service, Internet of Vehicles, and smart transportation.

FIG. 1 is a schematic diagram of an implementation environment of an audio processing method according to an embodiment of this application. As shown in FIG. 1, the implementation environment may include a terminal device 101 and a server 102.

The audio processing method provided in this embodiment of this application may be executed by the terminal device 101 or the server 102, or may be jointly performed by the terminal device 101 and the server 102, which is not limited in the embodiments of this application. When the audio processing method provided in this embodiment of this application is jointly performed by the terminal device 101 and the server 102, the server 102 is responsible for primary computing work, and the terminal device 101 is responsible for secondary computing work. Alternatively, the server 102 is responsible for secondary computing work, and the terminal device 101 is responsible for primary computing work. Alternatively, a distributed computing architecture is used between the server 102 and the terminal device 101 to perform collaborative computing.

In some embodiments, the terminal device 101 may be an electronic product that can perform human-machine interaction with a user in one or more manners, such as through a keyboard, a touch pad, a touch screen, a remote control, voice interaction, or a handwriting device. The terminal device 101 includes but is not limited to a mobile phone, a computer, a smart voice interaction device, a smart home appliance, a vehicle terminal, an aerial vehicle, and the like. The server 102 may be any one of an independent server, a server cluster including a plurality of servers, a cloud computing platform and virtualization center, or a node in a blockchain system, which is not limited in the embodiments of this application. The server 102 is in communication connection with the terminal device 101 through a wired network or a wireless network. The server 102 has a data receiving function, a data processing function, and a data transmitting function. Certainly, the server 102 may also have other functions, which are not limited in the embodiments of this application.

It is to be understood by a person skilled in the art that the foregoing terminal device 101 and the server 102 are merely examples for description, and that other existing or possible future terminal devices or servers, if applicable to this application, may also fall within the protection scope of this application and are incorporated herein by reference.

An audio processing method is provided in an embodiment of this application. The method is performed by a computer device and may be applied in the implementation environment shown in FIG. 1. The computer device may be the terminal device 101 or the server 102 in FIG. 1, which is not limited in the embodiments of this application. A flowchart of an audio processing method according to an embodiment of this application shown in FIG. 2 is used as an example. As shown in FIG. 2, the method includes the following step 201 to step 205:

Step 201: Determine a voiceprint vector corresponding to each of a plurality of audio segments, the voiceprint vector being used for indicating a voiceprint feature corresponding to each audio segment.

In this embodiment of this application, before the voiceprint vector corresponding to each of the plurality of audio segments is determined, the plurality of audio segments are needed to be obtained first. The plurality of audio segments are at least two audio segments, and each audio segment corresponds to one audio object. The audio object is a sound-producing object of the audio segment, and different audio segments correspond to a same audio object or different audio objects. A process for obtaining the plurality of audio segments is not limited in the embodiments of this application. For example, a plurality of candidate segments are stored in storage space of the computer device, and a plurality of audio segments are obtained from the plurality of candidate segments.

In one embodiment, one piece of voice data may alternatively be obtained. The voice data includes audio segments of the plurality of audio objects. The voice data is segmented to obtain a plurality of voice segments. In the plurality of voice segments, a plurality of to-be-processed audio segments are determined. For example, the plurality of voice segments are used as the to-be-processed audio segments, or some voices segments are selected from the plurality of voice segments to be used as the to-be-processed audio segments. For example, song data is obtained and used as the voice data, and according to lyrics segment, the voice data is segmented into a plurality of voice segments to be used as audio segments.

Duration corresponding to the plurality of audio segments may be the same or different, which is not limited in the embodiments of this application. For example, the duration corresponding to the plurality of audio segments is two seconds. For another example, duration corresponding to some of the plurality of audio segments is two seconds, and duration corresponding to some of the plurality of audio segments is five seconds.

In one embodiment, after the plurality of to-be-processed audio segments are determined, feature extraction is performed on each audio segment to obtain a feature corresponding to each audio segment. The voiceprint vector corresponding to each audio segment is determined according to the feature corresponding to each audio segment. For example, the feature corresponding to each audio segment may be a Mel-scale frequency cepstral coefficient (MFCC) corresponding to each audio segment, a Mel spectrum feature corresponding to each audio segment, or another feature, which is not limited in the embodiments of this application.

In a possible implementation, a process in which the voiceprint vector corresponding to each audio segment is determined according to the feature corresponding to each audio segment includes: inputting the feature corresponding to the audio segment into a voiceprint extracting model, and using a result outputted by the voiceprint extracting model as the voiceprint vector corresponding to the audio segment. In one embodiment, the voiceprint extracting model may be any model, which is not limited in the embodiments of this application. For example, the voiceprint extracting model may be a convolution-long short-term memory-fully-connected deep neural network (CLDNN) model, or an X-vector (a main baseline model frame of the field of voiceprint recognition) based on a time delay neural network (TDNN), or an ecapa-tdnn (a model for extracting global voice features).

Step 202: Determine an initial similarity matrix according to the voiceprint vector corresponding to each audio segment, the initial similarity matrix including a similarity between voiceprint vectors corresponding to any two audio segments.

In a possible implementation, the voiceprint vector corresponding to each audio segment is determined in the foregoing step 201. A similarity between voiceprint vectors corresponding to any two audio segments is determined according to the voiceprint vector corresponding to each audio segment to obtain the initial similarity matrix.

In one embodiment, according to the voiceprint vector corresponding to each audio segment, a similarity between voiceprint vectors corresponding to any two audio segments is determined according to the following Formula (1):

$$a_{i,j} = d(v_i, v_j)\, i, j \in [1, N].\qquad\text{Formula (1)}$$

In the foregoing Formula (1), $a_{i,j}a_{i,j}$ is a similarity between a voiceprint vector corresponding to an $i^{th}$ audio segment and a voiceprint vector corresponding to a $j^{th}$ audio segment, $d(v_i, v_j)$ is a distance formula, $v_i$ is the voiceprint vector corresponding to the $i^{th}$ audio segment, $v_j$ is the voiceprint vector corresponding to the $j^{th}$ audio segment, and N is a total quantity of the plurality of audio segments.

In one embodiment, a cosine similarity distance between voiceprint vectors corresponding to any two audio segments may be used as a similarity between the voiceprint vectors corresponding to the two audio segments. Certainly, a similarity between voiceprint vectors corresponding to any two audio segments may be determined in other manners, which is not limited in the embodiments of this application.

A quantity of rows of the initial similarity matrix is a quantity of the plurality of audio segments, and a quantity of columns is the quantity of the plurality of audio segments. The initial similarity matrix is a symmetrization matrix. In other words, a similarity at an $i^{th}$ row and a $j^{th}$ column is the same as a similarity at a $j^{th}$ row and an $i^{th}$ column of the initial similarity matrix. Both i and j are positive integers not greater than the quantity of the plurality of audio segments.

A higher similarity between voiceprint vectors corresponding to any two audio segments indicates a higher possibility that audio objects corresponding to the two audio segments are a same audio object. On the contrary, a lower higher similarity between voiceprint vectors corresponding to any two audio segments indicates a lower possibility that audio objects corresponding to the two audio segments are a same audio object.

For example, the quantity of the plurality of audio segments is five. According to the voiceprint vector corresponding to each audio segment, a similarity between voiceprint vectors of any two audio segments is determined according to the foregoing Formula (1). Furthermore, according to the similarity between the voiceprint vectors corresponding to the two audio segments, the determined initial similarity matrix is a 5×5 matrix. The initial similarity matrix is shown as follows:

$$\begin{bmatrix} a_{1,1} & a_{1,2} & a_{1,3} & a_{1,4} & a_{1,5} \\ a_{2,1} & a_{2,2} & a_{2,3} & a_{2,4} & a_{2,5} \\ a_{3,1} & a_{3,2} & a_{3,3} & a_{3,4} & a_{3,5} \\ a_{4,1} & a_{4,2} & a_{4,3} & a_{4,4} & a_{4,5} \\ a_{5,1} & a_{5,2} & a_{5,3} & a_{5,4} & a_{5,5} \end{bmatrix}.$$

In the foregoing initial similarity matrix, $a_{1,1}$ represents a similarity between a voiceprint vector corresponding to the first audio segment and the voiceprint vector corresponding to the first audio segment, $a_{1,2}a_{1,2}$ represents a similarity between the voiceprint vector corresponding to the first audio segment and a voiceprint vector corresponding to the second audio segment. Other factors in the initial similarity matrix have similar meanings to $a_{1,1}$ and $a_{1,2}$, and details are not described herein again.

Step 203: Adjust the initial similarity matrix according to a dynamic threshold corresponding to each row of the initial similarity matrix to obtain a reference similarity matrix.

The dynamic threshold is used for adjusting similarity differences between different similarities. The dynamic threshold is used for reducing a difference between similarities of voiceprint vectors of audio segments of a same audio object and/or increasing a difference between similarities of voiceprint vectors of audio segments of different audio objects. In one embodiment, the reducing a difference between similarities of voiceprint vectors of audio segments of a same audio object refers to reducing a difference between a first similarity and a second similarity. The first similarity is a similarity between a voiceprint vector of a first audio segment and a voiceprint vector of a second audio segment. The second similarity is a similarity between the voiceprint vector of the first audio segment and a voiceprint vector of a third audio segment. The first audio segment, the second audio segment, and the third audio segment correspond to a same audio object. The increasing a difference between similarities of voiceprint vectors of audio segments of different audio objects refers to increasing a difference between the first similarity and a third similarity. The third similarity is a similarity between the voiceprint vector of the first audio segment and a voiceprint vector of a fourth audio segment. The first audio segment and the fourth audio segment correspond to different audio objects.

In a possible implementation, before the adjusting initial similarity matrix according to a dynamic threshold corresponding to each row of the initial similarity matrix to obtain a reference similarity matrix, the dynamic threshold corresponding to each row of the initial similarity matrix is further needed to be determined. The process includes: for any row of the initial similarity matrix, sorting similarities in a plurality of similarities in the row within a preset similarity range according to a first order to obtain a first sorting result; determining a similarity difference between two adjacent similarities in the similarities within the preset similarity range according to the first sorting result to obtain a plurality of similarity differences, a quantity of the similarity differences being less than a quantity of similarities included in the row, in other words, determining a similarity difference between two adjacent similarities in the first sorting result to obtain a plurality of similarity differences; determining a similarity difference satisfying a first requirement in the plurality of similarity differences; and determining, according to the similarity difference satisfying the first requirement, a dynamic threshold corresponding to the row. In one embodiment, a minuend corresponding to the similarity difference satisfying the first requirement is used as the dynamic threshold corresponding to the row.

The first order may be the order from the smallest value to the largest value or the order from the largest value to the smallest value, which is not limited in the embodiments of this application. The preset similarity range is set based on experience or adjusted according to an implementation environment, which is also not limited in the embodiments of this application. For example, the preset similarity range is [−1, 1]. The similarity difference satisfying the first requirement in the plurality of similarity differences is a maximum similarity difference in the plurality of similarity differences.

For example, the first order is the order from the smallest value to the largest value, the preset similarity range is [−1, 1], and similarities in any row of the initial similarity matrix are: 1, −0.3, 0.7, 0.5, and 0.9. Similarities within the preset similarity range are sorted in the order from the smallest value to the largest value to obtain the first sorting result: −0.3, 0.5, 0.7, 0.9, and 1. Similarity difference between two adjacent similarities are determined according to the first sorting result to obtain a plurality of similarity differences: 0.5−(−0.3)=0.8, 0.7−0.5=0.2, 0.9−0.7=0.2, and 1−0.9=0.1. The maximum similarity difference in the plurality of similarity differences is 0.8. In this case, the minuend 0.5 corresponding to 0.8 is used as a dynamic threshold corresponding to any row. In some embodiments, when there are a plurality of minuends corresponding to the maximum similarity difference, any minuend is determined as the dynamic threshold.

In one embodiment, after the determining a similarity difference between two adjacent similarities in the similarities within the preset similarity range according to the first sorting result to obtain a plurality of similarity differences, a similarity difference vector may be further determined according to the plurality of similarity differences. The similarity difference vector includes the plurality of similarity differences. For example, the following Formula (2) is the similarity difference vector:

$$\mathrm{gap}_q = [a'_{q,2} - a'_{q,1}, a'_{q,3} - a'_{q,2}, \ldots, a'_{q,N} - a'_{q,N-1}]. \qquad \text{[Formula 2]}$$

In the foregoing Formula (2), $\mathrm{gap}_q$ is a similarity difference vector corresponding to any row, $a'_{q,1}$ is the first similarity in the first sorting result after sorting in the order from the smallest value to the largest value, $a'_{q,2}$ is the second similarity in the first sorting result after sorting in the order from the smallest value to the largest value, $a'_{q,3}$ is the third similarity in the first sorting result after sorting in the order from the smallest value to the largest value, $Q'_{q,N}$ is the last similarity in the first sorting result after sorting in the order from the smallest value to the largest value, and $a'_{q,N-1}$ is the last but one similarity in the first sorting result after sorting in the order from the smallest value to the largest value.

In a possible implementation, after the dynamic threshold corresponding to each row of the initial similarity matrix is determined, the initial similarity matrix is adjusted according to the dynamic threshold corresponding to each row of the initial similarity matrix by using the following two implementations to obtain a reference similarity matrix:

Implementation 1: Adjust a similarity that is in similarities included in a kth row of the initial similarity matrix and that is less than a dynamic threshold corresponding to the kth row to a first value, and obtain the reference similarity matrix based on an adjusted result of each row, k being a positive integer.

The first value is set based on experience or adjusted according to an implementation environment, which is not limited in the embodiments of this application. In one embodiment, the first value is 0.

For example, the initial similarity matrix is $$\begin{bmatrix} 1 & -0.3 & 0.7 & 0.5 & 0.9 \\ -0.3 & 1 & -0.5 & -0.7 & 0.6 \\ 0.7 & -0.5 & 1 & 0.8 & 0.4 \\ 0.5 & -0.7 & 0.8 & 1 & 0.2 \\ 0.9 & 0.6 & 0.4 & 0.2 & 1 \end{bmatrix} \begin{bmatrix} 1 & -0.3 & 0.7 & 0.5 & 0.9 \\ -0.3 & 1 & -0.5 & -0.7 & 0.6 \\ 0.7 & -0.5 & 1 & 0.8 & 0.4 \\ 0.5 & -0.7 & 0.8 & 1 & 0.2 \\ 0.9 & 0.6 & 0.4 & 0.2 & 1 \end{bmatrix}$$

A dynamic threshold corresponding to the first row is 0.5, a dynamic threshold corresponding to the second row is 0.6, a dynamic threshold corresponding to the third row is 0.7, a dynamic threshold corresponding to the fourth row is 0.2, and a dynamic threshold corresponding to the fifth row is 0.9. In this case, a similarity that is in the similarities included in each row of the initial similarity matrix and that is less than the dynamic threshold corresponding to each row is adjusted to 0 to obtain the reference similarity matrix $$\begin{bmatrix} 1 & 0 & 0.7 & 0.5 & 0.9 \\ 0 & 1 & 0 & 0 & 0.6 \\ 0.7 & 0 & 1 & 0.8 & 0 \\ 0.5 & 0 & 0.8 & 1 & 0.2 \\ 0.9 & 0 & 0 & 0 & 1 \end{bmatrix} \begin{bmatrix} 1 & 0 & 0.7 & 0.5 & 0.9 \\ 0 & 1 & 0 & 0 & 0.6 \\ 0.7 & 0 & 1 & 0.8 & 0 \\ 0.5 & 0 & 0.8 & 1 & 0.2 \\ 0.9 & 0 & 0 & 0 & 1 \end{bmatrix}.$$

Implementation 2: Multiply a similarity that is in similarities included in a kth row of the initial similarity matrix and that is less than a dynamic threshold corresponding to the kth row by a second value, and obtain the reference similarity matrix based on an adjusted result of each row.

The second value is set based on experience or adjusted according to an implementation environment, which is not limited in the embodiments of this application. In one embodiment, the second value is 0.01.

For example, the initial similarity matrix is $$\begin{bmatrix} 1 & -0.3 & 0.7 & 0.5 & 0.9 \\ -0.3 & 1 & -0.5 & -0.7 & 0.6 \\ 0.7 & -0.5 & 1 & 0.8 & 0.4 \\ 0.5 & -0.7 & 0.8 & 1 & 0.2 \\ 0.9 & 0.6 & 0.4 & 0.2 & 1 \end{bmatrix}.$$

A dynamic threshold corresponding to the first row is 0.5, a dynamic threshold corresponding to the second row is 0.6, a dynamic threshold corresponding to the third row is 0.7, a dynamic threshold corresponding to the fourth row is 0.2, and a dynamic threshold corresponding to the fifth row is 0.9. In this case, a similarity that is in the similarities included each row of the initial similarity matrix and that is less than the dynamic threshold corresponding to each row is multiplied by 0.01 to obtain the reference similarity matrix $$\begin{bmatrix} 1 & -0.003 & 0.7 & 0.5 & 0.9 \\ -0.003 & 1 & -0.005 & -0.007 & 0.6 \\ 0.7 & -0.005 & 1 & 0.8 & 0.004 \\ 0.5 & -0.007 & 0.8 & 1 & 0.2 \\ 0.9 & 0.006 & 0.004 & 0.002 & 1 \end{bmatrix}.$$

A distance between a first similarity and a second similarity in the reference similarity matrix is less than a distance between the first similarity and the second similarity in the initial similarity matrix, and a distance between the first similarity and a third similarity in the reference similarity matrix is greater than a distance between the first similarity and the third similarity in the initial similarity matrix, so as to reduce a difference between similarities of voiceprint vectors of audio segments of a same audio object and to increase a difference between voiceprint vectors of similarities of audio segments of different audio objects.

Step 204: Determine, according to the reference similarity matrix, a quantity of audio objects of the plurality of audio segments obtained by sound production.

In a possible implementation, a process of determining the quantity of the audio objects in the plurality of audio segments according to the reference similarity matrix includes: processing the reference similarity matrix according to a plurality of reference parameters to obtain a similarity matrix corresponding to each reference parameter; and determining the quantity of the audio objects in the plurality of audio segments according to the plurality of reference parameters and the similarity matrix corresponding to the reference parameter. The reference parameter is set based on experience or adjusted according to an implementation environment, which is not limited in the embodiments of this application. A quantity of the reference parameters is also not limited in this application.

In one embodiment, processes of processing the reference similarity matrix according to a plurality of reference parameters to obtain a similarity matrix corresponding to each reference parameter are similar. A process of determining a similarity matrix corresponding to any reference parameter in the plurality of reference parameters is merely used as an example for description in the embodiments of this application, and the process includes the following step 1 to step 5:

Step 1: Perform value adjustment on the reference similarity matrix according to any reference parameter to obtain a first similarity matrix, the value adjustment being used for simplifying the reference similarity matrix.

In a possible implementation, value adjustment is performed on the reference similarity matrix according to any reference parameter by using the following manners to obtain a first similarity matrix:

Manner 1: For a plurality of similarities included in each row of the reference similarity matrix, adjust a similarity other than the reference parameter (quantity) of similarities satisfying a third requirement are adjusted to a third value to obtain the first similarity matrix.

The third value is set based on experience or adjusted according to an implementation environment, which is not limited in the embodiments of this application. For example, the third value is 0. The reference parameter (quantity) of similarities satisfying the third requirement are the reference parameter (quantity) of maximum similarities. In other words, the reference parameter (quantity) of similarities are adjusted to a third value, and the similarities adjusted to the third value are maximum similarities in rows of the reference similarity matrix.

In one embodiment, the plurality of similarities included in each row of the reference similarity matrix are sorted in the order from the largest value to the smallest value to obtain a sorting result corresponding to each row, and a similarity that is in the sorting result corresponding to each row and that is other than the foregoing reference parameter (quantity) of similarities is adjusted to the third value to obtain the first similarity matrix.

For example, the reference parameter is 3, the third value is 0, and the reference similarity matrix is $$\begin{bmatrix} 1 & -0.003 & 0.7 & 0.5 & 0.9 \\ -0.003 & 1 & -0.005 & -0.007 & 0.6 \\ 0.7 & -0.005 & 1 & 0.8 & 0.004 \\ 0.5 & -0.007 & 0.8 & 1 & 0.2 \\ 0.9 & 0.006 & 0.004 & 0.002 & 1 \end{bmatrix}.$$

According to the reference parameter, three similarities satisfying the third requirement in the first row are determined as 1, 0.9, and 0.7, three similarities satisfying the third requirement in the second row are determined as 1, 0.6, and −0.003, three similarities satisfying the third requirement in the third row are determined as 1, 0.8, and 0.7, three similarities satisfying the third requirement in the fourth row are determined as 1, 0.8, and 0.5, and three similarities satisfying the third requirement in the fifth row are determined as 1, 0.9, and 0.006. The reference similarity matrix is adjusted to obtain the first similarity matrix $$\begin{bmatrix} 1 & 0 & 0.7 & 0 & 0.9 \\ -0.003 & 1 & 0 & 0 & 0.6 \\ 0.7 & 0 & 1 & 0.8 & 0 \\ 0.5 & 0 & 0.8 & 1 & 0 \\ 0.9 & 0.006 & 0 & 0 & 1 \end{bmatrix}.$$

Manner 2: Multiply a similarity that is in a plurality of similarities included in the reference similarity matrix and that is other than the reference parameter (quantity) of similarities satisfying a third requirement by a fourth value to obtain the first similarity matrix.

The fourth value is set based on experience or adjusted according to an implementation environment, which is not limited in the embodiments of this application. For example, the fourth value is 0.01.

In one embodiment, the plurality of similarities included in each row of the reference similarity matrix are sorted in the order from the largest value to the smallest value to obtain a sorting result corresponding to each row, and a similarity that is in the sorting result corresponding to each row and that is other than the foregoing reference parameter (quantity) of similarities is multiplied by the fourth value to obtain the first similarity matrix. In other words, a similarity other than the reference parameter (quantity) of similarities is multiplied by the fourth value, and the reference parameter (quantity) of similarities are maximum similarities in rows of the reference similarity matrix.

For example, the reference parameter is 3, the fourth value is 0.01, and the reference similarity matrix is $$
\begin{bmatrix}
1 & -0.003 & 0.7 & 0.5 & 0.9 \\
-0.003 & 1 & -0.005 & -0.007 & 0.6 \\
0.7 & -0.005 & 1 & 0.8 & 0.004 \\
0.5 & -0.007 & 0.8 & 1 & 0.2 \\
0.9 & 0.006 & 0.004 & 0.002 & 1
\end{bmatrix}.
$$

According to the reference parameter, three similarities satisfying the third requirement in the first row are determined as 1, 0.9, and 0.7, three similarities satisfying the third requirement in the second row are determined as 1, 0.6, and −0.003, three similarities satisfying the third requirement in the third row are determined as 1, 0.8, and 0.7, three similarities satisfying the third requirement in the fourth row are determined as 1, 0.8, and 0.5, and three similarities satisfying the third requirement in the fifth row are determined as 1, 0.9, and 0.006. The reference similarity matrix is adjusted to obtain the first similarity matrix $$
\begin{bmatrix}
1 & -0.00003 & 0.7 & 0.005 & 0.9 \\
-0.003 & 1 & -0.00005 & -0.00007 & 0.6 \\
0.7 & -0.00005 & 1 & 0.8 & 0.00004 \\
0.5 & -0.00007 & 0.8 & 1 & 0.002 \\
0.9 & 0.006 & 0.00004 & 0.00002 & 1
\end{bmatrix}.
$$

Any one of the foregoing manners may be selected to perform the value adjustment on the reference similarity matrix to obtain the first similarity matrix, which is not limited in the embodiments of this application.

In one embodiment, the value adjustment is performed on the reference similarity matrix according to the following Formula (3) to obtain the first similarity matrix.

$$
B = \text{Threshold}(A, p). \qquad \text{Formula (3)}
$$

In the foregoing Formula (3), B is the first similarity matrix, A is the reference similarity matrix, p is any reference parameter, and Threshold is a value adjustment function.

Step 2: Perform symmetrization on the first similarity matrix to obtain a second similarity matrix, a similarity at an $i^{th}$ row and a $j^{th}$ column being the same as a similarity at a $j^{th}$ row and an $i^{th}$ column of the second similarity matrix, and i and j being positive integers not greater than a quantity of the plurality of audio segments.

Because the initial similarity matrix is a symmetrization matrix, and the first similarity matrix after the dynamic threshold processing and the value adjustment are performed may be a non-symmetrization matrix, symmetrization is performed on the first similarity matrix. Because a similarity between a voiceprint vector of an $i^{th}$ audio segment and a voiceprint vector of a $j^{th}$ audio segment is the same as a similarity between the voiceprint vector of the $j^{th}$ audio segment and the voiceprint vector of the $i^{th}$ audio segment, that is, a similarity at an $i^{th}$ row and a $j^{th}$ column is the same as a similarity at a $j^{th}$ row and an $i^{th}$ column, symmetrization needs to be performed on the first similarity matrix, to enable the similarity at the $i^{th}$ row and the $j^{th}$ column is the same as the similarity at the $j^{th}$ row and the $i^{th}$ column. In one embodiment, at least the following manners are used to perform symmetrization on the first similarity matrix to obtain the second similarity matrix:

Manner 1: Determine a transposed matrix corresponding to the first similarity matrix; add a similarity in the first similarity matrix and a similarity at a same position corresponding to the first similarity matrix in the transposed matrix to obtain a to-be-adjusted similarity matrix, and perform a halving operation on a plurality of similarities included in the to-be-adjusted similarity matrix to obtain the second similarity matrix.

In one embodiment, the symmetrization is performed on the first similarity matrix according to the following Formula (4) to obtain the second similarity matrix.

$$
C = \frac{1}{2}(B + B^T). \qquad \text{Formula (4)}
$$

In the foregoing Formula (4), C is the second similarity matrix, B is the first similarity matrix, and $B^T$ is the transposed matrix corresponding to the first similarity matrix.

For example, the first similarity matrix is $$
\begin{bmatrix}
1 & 0 & 0.7 & 0 & 0.9 \\
-0.003 & 1 & 0 & 0 & 0.6 \\
0.7 & 0 & 1 & 0.8 & 0 \\
0.5 & 0 & 0.8 & 1 & 0 \\
0.9 & 0.006 & 0 & 0 & 1
\end{bmatrix},
$$

and the transposed matrix corresponding to the first similarity matrix is $$
\begin{bmatrix}
1 & -0.003 & 0.7 & 0.5 & 0.9 \\
0 & 1 & 0 & 0 & 0.006 \\
0.7 & 0 & 1 & 0.8 & 0 \\
0 & 0 & 0.8 & 1 & 0 \\
0.9 & 0.6 & 0 & 0 & 1
\end{bmatrix}.
$$

The similarity of the first similarity matrix is added with the similarity at the same position corresponding to the first similarity matrix in the transposed matrix to obtain the to-be-adjusted similarity matrix $$\begin{bmatrix} 2 & -0.003 & 1.4 & 0.5 & 1.8 \\ -0.003 & 2 & 0 & 0 & 0.606 \\ 1.4 & 0 & 2 & 1.6 & 0 \\ 0.5 & 0 & 1.6 & 2 & 0 \\ 1.8 & 0.606 & 0 & 0 & 2 \end{bmatrix}.$$

The halving operation is performed on the plurality of similarities included in the to-be-adjusted similarity matrix to obtain the second similarity matrix $$\begin{bmatrix} 1 & -0.0015 & 0.7 & 0.25 & 0.9 \\ -0.0015 & 1 & 0 & 0 & 0.303 \\ 0.7 & 0 & 1 & 0.8 & 0 \\ 0.25 & 0 & 0.8 & 1 & 0 \\ 0.9 & 0.303 & 0 & 0 & 1 \end{bmatrix}.$$

Manner 1 is a process of determining the second similarity matrix in a manner of averaging according to the first similarity matrix and the transposed matrix corresponding to the first similarity matrix.

Manner 2: Determine a maximum similarity between a similarity at an $i^{th}$ row and a $j^{th}$ column of the first similarity matrix and a similarity at a $j^{th}$ row and an $i^{th}$ column of the first similarity matrix, and use the maximum similarity as the similarities at the $i^{th}$ row and the $j^{th}$ column of and at the $j^{th}$ row and the $i^{th}$ column of the second similarity matrix to obtain the second similarity matrix.

In one embodiment, the symmetrization is performed on the first similarity matrix according to the following Formula (5) to obtain the second similarity matrix.

$$a'_{ij} = \max(a_{ij}, a_{ji}). \qquad \text{Formula (5)}$$

In the foregoing Formula (5), $a'_{i,j}$ is the similarity at the $i^{th}$ row and the $j^{th}$ column of the second similarity matrix, $a_{ij}$ is the similarity at the $i^{th}$ row and the $j^{th}$ column of the first similarity matrix, and $a_{ji}$ is the similarity at the $j^{th}$ row and the $i^{th}$ column of the first similarity matrix.

For example, the first similarity matrix is $$\begin{bmatrix} 1 & 0 & 0.7 & 0 & 0.9 \\ -0.003 & 1 & 0 & 0 & 0.6 \\ 0.7 & 0 & 1 & 0.8 & 0 \\ 0.5 & 0 & 0.8 & 1 & 0 \\ 0.9 & 0.006 & 0 & 0 & 1 \end{bmatrix}.$$

In this case, the second similarity matrix is $$\begin{bmatrix} 1 & 0 & 0.7 & 0.5 & 0.9 \\ 0 & 1 & 0 & 0 & 0.6 \\ 0.7 & 0 & 1 & 0.8 & 0 \\ 0.5 & 0 & 0.8 & 1 & 0 \\ 0.9 & 0.6 & 0 & 0 & 1 \end{bmatrix}.$$

Manner 2 is a process of determining the second similarity matrix in a manner of taking a maximum value according to the first similarity matrix.

Any one of the foregoing manners may be selected to perform the symmetrization on the first similarity matrix to obtain the second similarity matrix, which is not limited in the embodiments of this application.

Step 3: Perform row-column diffusion on the second similarity matrix to obtain a third similarity matrix, the third similarity matrix being used for generating boundaries between a plurality of audio objects.

In a possible implementation, a process of performing row-column diffusion on the second similarity matrix to obtain a third similarity matrix includes: determining a transposed matrix corresponding to the second similarity matrix; and determining the third similarity matrix according to the second similarity matrix and the transposed matrix corresponding to the second similarity matrix, a similarity at an $m^{th}$ row and an $n^{th}$ column of the third similarity matrix being determined based on similarities at an $m^{th}$ row of the second similarity matrix and similarities at an $n^{th}$ column of the transposed matrix corresponding to the second similarity matrix, and m and n being positive integers not greater than the quantity of the plurality of audio segments.

In one embodiment, for the similarity at the $m^{th}$ row and the $n^{th}$ column of the third similarity matrix, a result obtained by multiplying each similarity at the $m^{th}$ row of the second similarity matrix by a corresponding similarity at the $n^{th}$ column of the transposed matrix corresponding to the second similarity matrix and adding products is used as the similarity at the $m^{th}$ row and the $n^{th}$ column of the third similarity matrix.

For example, similarities at the $m^{th}$ row of the second similarity matrix are 1, 0, 0.7, 0.5, and 0.9, and similarities at the $n^{th}$ column of the transposed matrix corresponding to the second similarity matrix are 1, 0, 0.7, 0.5, and 0.9. In this case, similarities at the $m^{th}$ row and the $n^{th}$ column of the third similarity matrix are $1 \times 1 + 0 \times 0 + 0.7 \times 0.7 + 0.5 \times 0.5 + 0.9 \times 0.9 = 2.55$.

A process of determining a similarity at another position of the third similarity matrix is similar to the foregoing process of determining the similarity at the $m^{th}$ row and the $n^{th}$ column, and details are not described herein again.

In one embodiment, the row-column diffusion is performed on the second similarity matrix according to the following Formula (6) to obtain the third similarity matrix.

$$D = CC^{T}. \qquad \text{Formula (6)}$$

In the foregoing Formula (6), D is the third similarity matrix, C is the second similarity matrix, and $C^{T}$ is the transposed matrix corresponding to the second similarity matrix.

For example, the second similarity matrix is $$\begin{bmatrix} 1 & 0 & 0.7 & 0.5 & 0.9 \\ 0 & 1 & 0 & 0 & 0.6 \\ 0.7 & 0 & 1 & 0.8 & 0 \\ 0.5 & 0 & 0.8 & 1 & 0 \\ 0.9 & 0.6 & 0 & 0 & 1 \end{bmatrix},$$

and the transposed matrix corresponding to the second similarity matrix is $$\begin{bmatrix} 1 & 0 & 0.7 & 0.5 & 0.9 \\ 0 & 1 & 0 & 0 & 0.6 \\ 0.7 & 0 & 1 & 0.8 & 0 \\ 0.5 & 0 & 0.8 & 1 & 0 \\ 0.9 & 0.6 & 0 & 0 & 1 \end{bmatrix}.$$

In this case, the third similarity matrix is $$
\begin{bmatrix}
2.55 & 0.54 & 1.8 & 0.56 & 1.8 \\
0.54 & 1.36 & 0 & 0 & 1.2 \\
1.8 & 0 & 2.13 & 1.95 & 0.63 \\
1.56 & 0 & 1.95 & 1.89 & 0.45 \\
1.8 & 1.2 & 0.63 & 0.45 & 2.17
\end{bmatrix}.
$$

Step 4: Perform ratio adjustment on the third similarity matrix to obtain a fourth similarity matrix, the ratio adjustment being used for adjusting similarities included in each row of the third similarity matrix within a same range.

In a possible implementation, a process of performing ratio adjustment on the third similarity matrix to obtain a fourth similarity matrix includes: determining, according to a plurality of similarities included in each row of the third similarity matrix, a maximum similarity corresponding to each row; and dividing a plurality of similarities included in each row of the third similarity matrix by the maximum similarity corresponding to each row to obtain the fourth similarity matrix.

In one embodiment, the ratio adjustment is performed on the third similarity matrix according to the following Formula (7) to obtain the fourth similarity matrix.

$$
a''_{ij} = a_{ij}/a_{ik}. \qquad \text{Formula (7)}
$$

In the foregoing Formula (7), $a''_{ij}$ is a similarity at an $i^{th}$ row and a $j^{th}$ column of the fourth similarity matrix, $a_{ij}$ is a similarity at an $i^{th}$ row and a $j^{th}$ column of the third similarity matrix, $a_{ik}$ is a maximum similarity corresponding to the $i^{th}$ row of the third similarity matrix, and k is the column at which the maximum similarity corresponding to the $i^{th}$ row of the third similarity matrix is located.

For example, the third similarity matrix is $$
\begin{bmatrix}
2.55 & 0.54 & 1.8 & 0.56 & 1.8 \\
0.54 & 1.36 & 0 & 0 & 1.2 \\
1.8 & 0 & 2.13 & 1.95 & 0.63 \\
1.56 & 0 & 1.95 & 1.89 & 0.45 \\
1.8 & 1.2 & 0.63 & 0.45 & 2.17
\end{bmatrix}.
$$

A maximum similarity corresponding to the first row is 2.55, a maximum similarity corresponding to the second row is 1.36, a maximum similarity corresponding to the third row is 2.13, a maximum similarity corresponding to the fourth row is 1.95, and a maximum similarity corresponding to the fifth row is 2.17. According to the maximum similarity corresponding to each row, the ratio adjustment is performed on the third similarity matrix to obtain the fourth similarity matrix $$
\begin{bmatrix}
1 & 0.212 & 0.76 & 0.612 & 0.706 \\
0.397 & 1 & 0 & 0 & 0.882 \\
0.845 & 0 & 1 & 0.915 & 0.296 \\
0.8 & 0 & 1 & 0.969 & 0.231 \\
0.829 & 0.553 & 0.29 & 0.207 & 1
\end{bmatrix}.
$$

Step 5: Perform symmetrization on the fourth similarity matrix to obtain a similarity matrix corresponding to the reference parameter.

In a possible implementation, a process of performing symmetrization on the fourth similarity matrix to obtain a similarity matrix corresponding to the reference parameter is similar to the foregoing process of performing symmetrization on the first similarity matrix to obtain a second similarity matrix, and details are not described herein again.

According to the foregoing process in step 1 to step 5, the similarity matrix corresponding to each reference parameter is determined.

FIG. 3 is a schematic diagram of a process of determining a similarity matrix according to an embodiment of this application. Section (1) in FIG. 3 is an initial similarity matrix, section (2) in FIG. 3 is a reference similarity matrix, section (3) in FIG. 3 is a first similarity matrix, section (4) in FIG. 3 is a third similarity matrix, section (5) in FIG. 3 is a fourth similarity matrix, and section (6) in FIG. 3 is a similarity matrix corresponding to a reference parameter. The horizontal axis in section (1) in FIG. 3 represents a quantity of audio segments, and the vertical axis in section (1) in FIG. 3 represents a quantity of audio segments. Higher lightness of the region indicates a higher similarity between voiceprint vectors of the two audio segments.

In a possible implementation, a process of determining the quantity of the audio objects in the plurality of audio segments according to the plurality of reference parameters and the similarity matrix corresponding to each reference parameter includes: determining, according to the plurality of reference parameters and the similarity matrix corresponding to each reference parameter, a ratio value corresponding to each reference parameter, the ratio value being used for indicating a quantity of similarities remaining in the similarity matrix corresponding to the reference parameter; and determining the quantity of the audio objects in the plurality of audio segments according to the ratio value corresponding to each reference parameter. A smaller ratio value indicates a smaller quantity of similarities remaining in the similarity matrix corresponding to the reference parameters and higher accuracy of determining a quantity of audio objects subsequently. Otherwise, a greater ratio value indicates a greater quantity of similarities remaining in the similarity matrix corresponding to the reference parameters and lower accuracy of determining a quantity of audio objects subsequently.

In one embodiment, a process of determining, according to the plurality of reference parameters and the similarity matrix corresponding to each reference parameter, a ratio value corresponding to the reference parameter includes: for any one of the plurality of reference parameters, performing Laplace transform on a similarity matrix corresponding to the reference parameter to obtain a Laplace matrix corresponding to the reference parameter; performing singular value decomposition on the Laplace matrix to obtain a plurality of reference eigenvalues; determining a second eigenvalue and a first quantity of first eigenvalues in the plurality of reference eigenvalues, the second eigenvalue being a maximum value in the plurality of reference eigenvalues, and the first eigenvalue being a reference eigenvalue satisfying a second requirement after the plurality of reference eigenvalues being sorted according to a second order; determining a difference between two adjacent first eigenvalues of the first quantity of first eigenvalues to obtain a plurality of eigenvalue differences; perform normalization on a first eigenvalue difference according to the second eigenvalue to obtain a normalized eigenvalue difference, the first eigenvalue difference being a maximum eigenvalue difference in the plurality of eigenvalue difference; and determining, according to the normalized eigenvalue difference and the reference parameter, a ratio value correspond-
ing to the reference parameter. The first quantity is set based
on experience or adjusted according to an implementation
environment, which is not limited in the embodiments of this
application. For example, the first quantity is 3. The second
order may be the order from the smallest value to the largest
value or the order from the largest value to the smallest
value, which is not limited in the embodiments of this
application. When the second order is the order from the
smallest value to the largest value, the first eigenvalues are
a first quantity of reference eigenvalues from the beginning
after the plurality of reference eigenvalues are sorted in the
order from the smallest value to the largest value. When the
second order is the order from the largest value to the
smallest value, the first eigenvalues are a first quantity of
reference eigenvalues from the end after the plurality of
reference eigenvalues are sorted in the order from the largest
value to the smallest value.

In one embodiment, after the determining a difference
between two adjacent first eigenvalues of the first quantity of
first eigenvalues to obtain a plurality of eigenvalue differ-
ences, an eigenvalue difference vector corresponding to any
reference parameter may also be determined according to
the plurality of eigenvalue differences. The eigenvalue dif-
ference vector includes a plurality of eigenvalue differences.
For example, the following Formula (8) is the eigenvalue
difference vector corresponding to the reference parameter.

$$e_p = [\lambda_{p,2} - \lambda_{p,1}, \lambda_{p,3} - \lambda_{p,2}, \ldots, \lambda_{p,Y} - \lambda_{p,Y-1}].$$

<div align="right">Formula (8)</div>

In the foregoing Formula (8), $e_p$ is the eigenvalue differ-
ence vector corresponding to the reference parameter, $\lambda_{p,1}$ is
the first reference eigenvalue after the plurality of reference
eigenvalues are sorted according to the order from the
smallest value to the largest value, $\lambda_{2,2}$ is the second refer-
ence eigenvalue after the plurality of reference eigenvalues
are sorted according to the order from the smallest value to
the largest value, $\lambda_{p,3}$ is the third reference eigenvalue after
the plurality of reference eigenvalues are sorted according to
the order from the smallest value to the largest value, $\lambda_{p,Y}$ is
a $Y^{th}$ reference eigenvalue after the plurality of reference
eigenvalues are sorted according to the order from the
smallest value to the largest value, $\lambda_{p,Y-1}$ is a $(Y-1)^{th}$
reference eigenvalue after the plurality of reference eigen-
values are sorted according to the order from the smallest
value to the largest value, and Y is the first quantity.

In one embodiment, according to the second eigenvalue,
the normalization is performed on the eigenvalue difference
according to the following Formula (9) to obtain the nor-
malized eigenvalue difference.

$$g_P = \frac{\max(e_p)}{\lambda_{max} + \varepsilon}.$$

<div align="right">Formula (9)</div>

In the foregoing Formula (9), $g_p$ is the normalized eigen-
value difference, max ($e_p$) is the first eigenvalue difference,
$\lambda_{max}$ is the second eigenvalue, $\varepsilon$ is a normalization param-
eter, and a value of $\varepsilon$ is $1\times10^{-10}$.

According to the normalized eigenvalue difference and
any reference parameter, the ratio value corresponding to the
reference parameter is determined according to the follow-
ing Formula (10).

$$r(p) = \frac{p}{g_p}.$$

<div align="right">Formula (10)</div>

In the foregoing Formula (10), (p) is the ratio value
corresponding to any reference parameter, p is the reference
parameter, and $g_p$ is the normalized eigenvalue difference.

In a possible implementation, a process of determining
the quantity of the audio objects in the plurality of audio
segments according to the ratio value corresponding to each
reference parameter includes: determining a first parameter
in the plurality of reference parameters according to a ratio
value corresponding to each reference parameter, the first
parameter being a reference parameter corresponding to a
minimum ratio value in the plurality of reference param-
eters; determining a plurality of eigenvalue differences cor-
responding to the first parameter; and calling a first function
to process the plurality of eigenvalue differences corre-
sponding to the first parameter to obtain the quantity of the
audio objects in the plurality of audio segments. In one
embodiment, a reference parameter corresponding to a mini-
mum ratio value in the ratio values corresponding to the
reference parameters is used as the first parameter.

A process of determining a plurality of eigenvalue differ-
ences corresponding to the first parameter includes: deter-
mining a similarity matrix corresponding to the first param-
eter; performing Laplace transform on the similarity matrix
corresponding to the first parameter to obtain a Laplace
matrix corresponding to the first parameter; performing
singular value decomposition on the Laplace matrix corre-
sponding to the first parameter to obtain a plurality of
reference eigenvalues; sorting a first quantity of minimum
reference eigenvalues in the plurality of reference eigenval-
ues; and using differences between two adjacent reference
eigenvalues in a sorted result as the plurality of eigenvalue
differences corresponding to the first parameter.

A process of calling a first function to process the plurality
of eigenvalue differences corresponding to the first param-
eter to obtain the quantity of the audio objects in the plurality
of audio segments includes: using the plurality of eigenvalue
differences corresponding to the first parameter to form an
eigenvalue difference vector corresponding to the first
parameter; and calling the first function to process the
eigenvalue difference vector corresponding to the first
parameter to obtain the quantity of the audio objects in the
plurality of audio segments.

In one embodiment, the plurality of eigenvalue differ-
ences corresponding to the first parameter are processed
according to the following Formula (11) to obtain the
quantity of the audio objects in the plurality of audio
segments.

$$M = \text{argmax}(e_{\hat{p}}).$$

<div align="right">Formula (11)</div>

In the foregoing Formula (11), M is the quantity of the
audio objects in the) is the first function, and ex is the
eigenvalue plurality of audio segments, arg max (difference
vector corresponding to the first parameter. The eigenvalue
difference vector corresponding to the first parameter is a vector formed by the plurality of eigenvalue differences corresponding to the first parameter.

For example, the similarity matrix corresponding to the first parameter is a matrix Q. Laplace transform is performed on the matrix Q to obtain a Laplace matrix P corresponding to the first parameter. Singular value decomposition is performed on the matrix P to obtain a plurality of reference eigenvalues (which are $a_{i,j}$, b, c, d, e, and f). The plurality of reference eigenvalues are sorted in the order from the smallest value to the largest value to obtain a sorting result (b, c, a, e, f, and d). When the first quantity is 3, differences between two adjacent reference eigenvalues among the three minimum reference eigenvalues in the sorting result are used as the plurality of eigenvalue differences corresponding to the first parameter, and the plurality of eigenvalue differences are c-b and a-c. In this case, a vector formed by c-b and a-c is used as the eigenvalue difference vector. That is, the eigenvalue difference vector is [c-b, a-c].

Step 205: Cluster the plurality of audio segments according to the quantity of the audio objects to obtain an audio segment obtained by sound production by each audio object.

In a possible implementation, a process of after the determining the quantity of the audio objects in the plurality of audio segments based on the foregoing step 204, clustering the plurality of audio segments according to the quantity of the audio objects to obtain an audio segment corresponding to each audio object includes: performing singular value decomposition on a similarity matrix corresponding to the first parameter to obtain a plurality of decomposition eigenvalues; determining an audio object quantity of decomposition eigenvalues in the plurality of decomposition eigenvalues; determining an eigenvector corresponding to each of the audio object quantity of decomposition eigenvalues; generating a decomposition matrix according to the eigenvector corresponding to each of the audio object quantity of decomposition eigenvalues, a quantity of rows of the decomposition matrix being the quantity of the audio objects, and a quantity of columns being the quantity of the audio segments; determining, according to the decomposition matrix, an eigenvector corresponding to each of the plurality of audio segments, the eigenvector being used for indicating a corresponding audio segment; and clustering the plurality of audio segments according to the quantity of the audio objects and the eigenvector corresponding to each of the plurality of audio segments to obtain the audio segment corresponding to each audio object.

In one embodiment, when the audio object quantity of decomposition eigenvalues are determined in the plurality of decomposition eigenvalues, the determined decomposition eigenvalues are a minimum audio object quantity of decomposition eigenvalues.

For example, if the quantity of the audio objects is three, three minimum decomposition eigenvalues in the plurality of decomposition eigenvalues are determined. Each eigenvector corresponding to the three decomposition eigenvalues is determined. The eigenvector corresponding to the decomposition eigenvalue is a 1×5 eigenvector, and the three 1×5 eigenvectors form a 3×5 decomposition matrix. The first column in the decomposition matrix is used as an eigenvector corresponding to the first audio segment, the second column is used as an eigenvector corresponding to the second audio segment, the third column is used as an eigenvector corresponding to the third audio segment, the fourth column is used as an eigenvector corresponding to the fourth audio segment, and the fifth column is used as an eigenvector corresponding to the fifth audio segment.

For example, the eigenvectors corresponding to the three decomposition eigenvalues are $[x_1, x_2, x_3, x_4, x_5]$, $[y_1, y_2, y_3, y_4, y_5]$, and $[z_1, z_2, z_3, z_4, z_5]$, and the decomposition matrix formed according to the eigenvectors corresponding to the three decomposition eigenvalues is $$\begin{bmatrix} x_1 & x_2 & x_3 & x_4 & x_5 \\ y_1 & y_2 & y_3 & y_4 & y_5 \\ z_1 & z_2 & z_3 & z_4 & z_5 \end{bmatrix}.$$

In this case, $[x_1, y_1, z_1]$ is used as the eigenvector corresponding to the first audio segment, $[x_2, y_2, z_2]$ is used as the eigenvector corresponding to the second audio segment, $[x_3, y_3, z_3]$ is used as the eigenvector corresponding to the third audio segment, $[x_4, y_4, z_4]$ is used as the eigenvector corresponding to the fourth audio segment, and $[x_5, y_5, z_5]$ is used as the eigenvector corresponding to the fifth audio segment.

In one embodiment, according to the quantity of the audio objects and the eigenvectors corresponding to the plurality of audio segments, the plurality of audio segments are clustered by using a K-means clustering algorithm to obtain the audio segment corresponding to each audio object, and k is the quantity of the audio objects. Certainly, the plurality of audio segments may be clustered by using another clustering algorithm, which is not limited in the embodiments of this application herein.

For example, there are five to-be-processed audio segments, an audio segment 1, an audio segment 2, an audio segment 3, an audio segment 4, and an audio segment 5. According to the foregoing step 201 to step 204, it is determined that a quantity of audio objects in the to-be-processed audio segments is three. According to the foregoing step 205, it is determined that audio segments corresponding to an audio object 1 are the audio segment 1 and the audio segment 3, an audio segment corresponding to an audio object 2 is the audio segment 5, and audio segments corresponding to an audio object 3 are the audio segment 2 and the audio segment 4.

In a possible implementation, after the determining the quantity of the audio objects in the plurality of audio segments in the foregoing step 204, the plurality of audio segments may be further clustered according to the quantity of the audio objects and the voiceprint vector corresponding to each of the plurality of audio segments to obtain the audio segment corresponding to each audio object.

A process of clustering the plurality of audio segments according to the quantity of audio objects and the voiceprint vector corresponding to each of the plurality of audio segments to obtain the audio segment corresponding to each audio object is similar to the foregoing process of clustering the plurality of audio segments according to the quantity of the audio objects and the eigenvector corresponding to each of the plurality of audio segments to obtain the audio segment corresponding to each audio object, and details are not described herein again.

The audio processing method provided in the embodiments of this application may be applied in the field of games to determine a quantity of users using the same account (or the same smart device). In one embodiment, audio segments during using of the game account (or the same smart device) by a user are acquired, the audio processing method provided in the embodiments of this application is called to determine a voiceprint vector corresponding to each audio segment, and a quantity of audio objects in the audio segments and an audio segment corresponding to each audio object are determined according to the voiceprint vector corresponding to each audio segment, so as to learn the quantity of the users using the game account (or the smart device).

According to the foregoing method, an initial similarity matrix is adjusted according to a dynamic threshold corresponding to each row of an initial similarity matrix to obtain a reference similarity matrix. In this way, through a dynamic threshold adjustment process, similarities between voiceprint vectors of audio segments of a same audio object increase and similarities between voiceprint vectors of audio segments of different audio objects decrease, so that a quantity of audio objects determined according to the reference similarity matrix is more accurate. In addition, a plurality of audio segments are clustered according to the quantity of the audio objects with higher accuracy to obtain an audio segment corresponding to each audio object. In this way, accuracy of the determined audio segment corresponding to each audio object is higher, and accuracy of clustering the audio object is higher, so that an audio processing effect on the audio segment can be improved.

According to the method provided in the embodiments, similarities at any row of the initial similarity matrix are sorted to determine a dynamic threshold according to differences between adjacent similarities in a sorting result of the similarities, so that the initial similarity matrix can be adjusted according to the dynamic threshold, thereby improving accuracy of increasing similarities between voiceprints of a same audio object and decreasing similarities between voiceprints of different audio objects and improving accuracy of determining a quantity of the audio objects.

According to the method provided in the embodiments, a first value of similarities of the initial similarity matrix is set based on the dynamic threshold, so that efficiency of adjusting the initial similarity matrix can be improved.

According to the method provided in the embodiments, a second value of similarities of the initial similarity matrix is calculated and set based on the dynamic threshold, so that flexibility and accuracy of setting an adjusted reference similarity matrix can be improved.

According to the method provided in the embodiments, a plurality of reference parameters are generated, and the reference similarity matrix is processed according to the plurality of reference parameters to obtain a similarity matrix corresponding to each reference parameter, so that accuracy of the similarity matrix and accuracy of determining the quantity of the audio objects can be improved.

According to the method provided in the embodiments, when the similarity matrix corresponding to each reference parameter is determined, after the reference similarity matrix is adjusted, because there is a possibility that an adjusted first similarity matrix is asymmetric, symmetrization is performed on a first similarity matrix, and then row-column diffusion and ratio adjustment is performed, so that accuracy of determining the similarity matrix can be improved.

According to the method provided in the embodiments, when the first similarity matrix is determined, any reference parameter (quantity) of similarities are determined according to a third requirement, value adjustment is performed on other similarities, and a second similarity matrix is determined according to the first similarity matrix and a corresponding transposed matrix, so that accuracy of the similarity matrix corresponding to the reference parameter can be improved.

Figure 4:
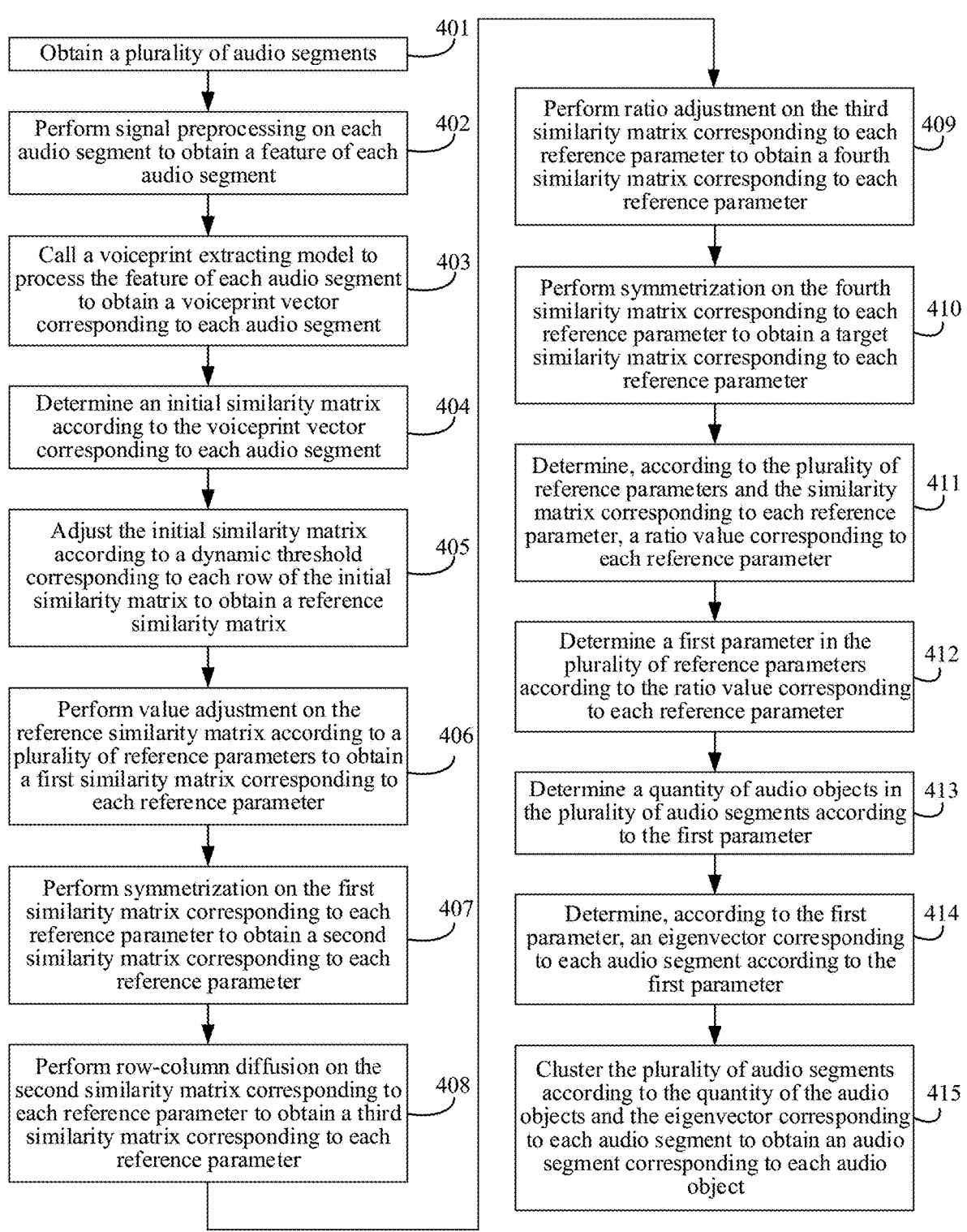
FIG. 4 is a schematic flowchart of another audio processing method according to an embodiment of this application.

FIG. 4 is a flowchart of another audio processing method according to an embodiment of this application. As shown in FIG. 4, the method may include the following step 401 to step 415:

401: Obtain a plurality of audio segments.

In a possible implementation, the process is described in the foregoing step 201, and details are not described herein again.

402: Perform signal preprocessing on each audio segment to obtain a feature of each audio segment.

In a possible implementation, the process is described in the foregoing step 201, and details are not described herein again. Manners for performing the signal preprocessing on the audio segment includes at least one of segmentation, noise reduction, sampling, quantization, and the like.

403: Call a voiceprint extracting model to process the feature of each audio segment to obtain a voiceprint vector corresponding to each audio segment.

In a possible implementation, the process is described in the foregoing step 201, and details are not described herein again. For example, the voiceprint extracting model may be a CLDNN model, a TDNN-based X-vector, or an ecapatdnn.

404: Determine an initial similarity matrix according to the voiceprint vector corresponding to each audio segment.

In a possible implementation, the process is described in the foregoing step 202, and details are not described herein again.

A similarity between voiceprint vectors corresponding to any two audio segments is determined, and the initial similarity matrix is constructed. Values on a vertical direction and a horizontal direction of the initial similarity matrix correspond to a quantity of the audio segments, so as to construct a corresponding matrix of similarities between the voiceprint vectors of the audio segments as the initial similarity matrix.

405: Adjust the initial similarity matrix according to a dynamic threshold corresponding to each row of the initial similarity matrix to obtain a reference similarity matrix.

In a possible implementation, the process is described in the foregoing step 203, and details are not described herein again. The dynamic threshold is used for increasing similarities between voiceprint features of audio segments corresponding to a same sound-producing object. Alternatively, the dynamic threshold is used for decreasing similarities between voiceprint features of audio segments corresponding to different sound-producing objects.

406: Perform value adjustment on the reference similarity matrix according to a plurality of reference parameters to obtain a first similarity matrix corresponding to each reference parameter.

In a possible implementation, the process is described in the foregoing step 204, and details are not described herein again. In one embodiment, for a plurality of similarities included in each row of the reference similarity matrix, a similarity other than any reference parameter (quantity) of similarities satisfying a third requirement is adjusted to a third value to obtain the first similarity matrix. Alternatively, a similarity that is in a plurality of similarities included in the reference similarity matrix and that is other than any reference parameter (quantity) of similarities satisfying a third requirement is multiplied by a fourth value to obtain the first similarity matrix.

407: Perform symmetrization on the first similarity matrix corresponding to each reference parameter to obtain a second similarity matrix corresponding to each reference parameter.

In a possible implementation, the process is described in the foregoing step 204, and details are not described herein again. Because the first similarity matrix may be asymmetric after the reference similarity matrix is adjusted to the first similarity matrix, the symmetrization is performed on the first similarity matrix to obtain the second similarity matrix.

408: Perform row-column diffusion on the second similarity matrix corresponding to each reference parameter to obtain a third similarity matrix corresponding to each reference parameter.

In a possible implementation, the process is described in the foregoing step 204, and details are not described herein again. The row-column diffusion is performed on the second similarity matrix by using a transposed matrix to obtain a third transposed matrix.

409: Perform ratio adjustment on the third similarity matrix corresponding to each reference parameter to obtain a fourth similarity matrix corresponding to each reference parameter.

In a possible implementation, the process is described in the foregoing step 204, and details are not described herein again. In one embodiment, a maximum similarity corresponding to each row is determined according to a plurality of similarities included in each row of the third similarity matrix. The plurality of similarities included in each row of the third similarity matrix are respectively divided by the maximum similarity corresponding to each row to obtain the fourth similarity matrix.

410: Perform symmetrization on the fourth similarity matrix corresponding to each reference parameter to obtain a similarity matrix corresponding to each reference parameter.

In a possible implementation, the process is described in the foregoing step 204, and details are not described herein again. Because the fourth similarity matrix is asymmetric after the ratio adjustment is performed on the third similarity matrix, the symmetrization is performed on the fourth similarity matrix to obtain the similarity matrix corresponding to the reference parameters.

411: Determine, according to the plurality of reference parameters and the similarity matrix corresponding to each reference parameter, a ratio value corresponding to each reference parameter.

In a possible implementation, the process is described in the foregoing step 204, and details are not described herein again. The ratio value is used for indicating a quantity of similarities remaining in the similarity matrix corresponding to the reference parameters. A smaller ratio value indicates a smaller quantity of similarities remaining in the similarity matrix corresponding to the reference parameters and higher accuracy of determining a quantity of audio objects subsequently. Otherwise, a greater ratio value indicates a greater quantity of similarities remaining in the similarity matrix corresponding to the reference parameters and lower accuracy of determining a quantity of audio objects subsequently.

412: Determine a first parameter in the plurality of reference parameters according to the ratio value corresponding to each reference parameter.

In a possible implementation, the process is described in the foregoing step 204, and details are not described herein again.

413: Determine a quantity of audio objects in the plurality of audio segments according to the first parameter.

In a possible implementation, the process is described in the foregoing step 204, and details are not described herein again.

414: Determine, according to the first parameter, an eigenvector corresponding to each audio segment.

In a possible implementation, the process is described in the foregoing step 205, and details are not described herein again.

415: Cluster the plurality of audio segments according to the quantity of the audio objects and the eigenvector corresponding to each audio segment to obtain an audio segment corresponding to each audio object.

In a possible implementation, the process is described in the foregoing step 205, and details are not described herein again.

Figure 5:
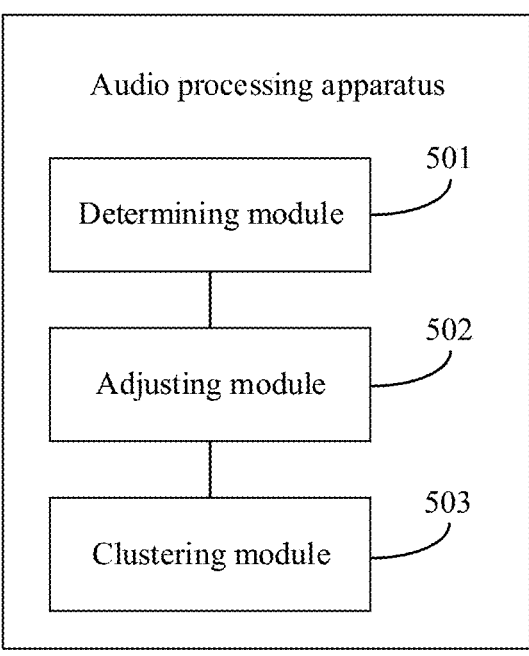
FIG. 5 is a schematic diagram of a structure of an audio processing apparatus according to an embodiment of this application.

FIG. 5 is a schematic diagram of a structure of an audio processing apparatus according to an embodiment of this application. As shown in FIG. 5, the apparatus includes:

a determining module 501, configured to determine a voiceprint vector corresponding to each of a plurality of audio segments, the voiceprint vector being used for indicating a voiceprint feature corresponding to each audio segment, the determining module 501 being further configured to determine an initial similarity matrix according to the voiceprint vector corresponding to each audio segment, and the initial similarity matrix including a similarity between voiceprint vectors corresponding to any two audio segments;

an adjusting module 502, configured to adjust the initial similarity matrix according to a dynamic threshold corresponding to each row of the initial similarity matrix to obtain a reference similarity matrix, the dynamic threshold being used for adjusting similarity differences between different similarities, the determining module 501 being further configured to determine, according to the reference similarity matrix, a quantity of audio objects of the plurality of audio segments obtained by sound production; and a clustering module 503, configured to cluster the plurality of audio segments according to the quantity of the audio objects to obtain an audio segment obtained by sound production by each audio object.

In a possible implementation, the determining module 501 is further configured to: for any row of the initial similarity matrix, sort similarities in the row within a preset similarity range according to a first order to obtain a first sorting result; determine a similarity difference between two adjacent similarities in the first sorting result to obtain a plurality of similarity differences; determine a similarity difference satisfying a first requirement in the plurality of similarity differences; and determine, according to the similarity difference satisfying the first requirement, a dynamic threshold corresponding to the row.

In a possible implementation, the adjusting module 502 is configured to: adjust a similarity that is in similarities included in a kth row of the initial similarity matrix and that is less than a dynamic threshold corresponding to the kth row to a first value, and obtain the reference similarity matrix based on an adjusted result of each row, k being a positive integer; or multiply a similarity that is in similarities included in a kth row of the initial similarity matrix and that is less than a dynamic threshold corresponding to the kth row by a second value, and obtain the reference similarity matrix based on an adjusted result of each row.

In a possible implementation, the determining module 501 is configured to: process the reference similarity matrix according to a plurality of reference parameters to obtain a similarity matrix corresponding to each reference parameter; and determine the quantity of the audio objects in the plurality of audio segments according to the plurality of reference parameters and the similarity matrix corresponding to each reference parameter.

In a possible implementation, the determining module 501 is configured to: for any one of the plurality of reference parameters, perform value adjustment on the reference similarity matrix according to the reference parameter to obtain a first similarity matrix, the value adjustment being used for simplifying the reference similarity matrix; perform symmetrization on the first similarity matrix to obtain a second similarity matrix, a similarity at an $i^{th}$ row and a $j^{th}$ column being the same as a similarity at a $j^{th}$ row and an $i^{th}$ column of the second similarity matrix, and i and j being positive integers not greater than a quantity of the plurality of audio segments; perform row-column diffusion on the second similarity matrix to obtain a third similarity matrix, the third similarity matrix being used for generating boundaries between a plurality of audio objects; perform ratio adjustment on the third similarity matrix to obtain a fourth similarity matrix, the ratio adjustment being used for adjusting similarities included in each row of the third similarity matrix within a same range; and perform symmetrization on the fourth similarity matrix to obtain a similarity matrix corresponding to the reference parameter.

In a possible implementation, the determining module 501 is configured to: for a plurality of similarities included in each row of the reference similarity matrix, adjust a similarity other than the reference parameter (quantity) of similarities satisfying a third requirement to a third value to obtain the first similarity matrix; or multiply a similarity that is in a plurality of similarities included in the reference similarity matrix and that is other than the reference parameter (quantity) of similarities satisfying a third requirement by a fourth value to obtain the first similarity matrix.

In a possible implementation, the determining module 501 is configured to: determine a transposed matrix corresponding to the first similarity matrix; add a similarity in the first similarity matrix and a similarity at a same position corresponding to the first similarity matrix in the transposed matrix to obtain a to-be-adjusted similarity matrix; and perform a halving operation on a plurality of similarities included in the to-be-adjusted similarity matrix to obtain the second similarity matrix.

In a possible implementation, the determining module 501 is configured to: determine a maximum similarity between a similarity at an $i^{th}$ row and a $j^{th}$ column of the first similarity matrix and a similarity at a $j^{th}$ row and an $i^{th}$ column of the first similarity matrix, and use the maximum similarity as the similarities at the $i^{th}$ row and the $j^{th}$ column and at the $j^{th}$ row and the $i^{th}$ column of the second similarity matrix to obtain the second similarity matrix.

In a possible implementation, the determining module 501 is configured to: determine a transposed matrix corresponding to the second similarity matrix; and determine the third similarity matrix according to the second similarity matrix and the transposed matrix corresponding to the second similarity matrix, a similarity at an $m^{th}$ row and an $n^{th}$ column of the third similarity matrix being determined based on similarities at an $m^{th}$ row of the second similarity matrix and similarities at an $n^{th}$ column of the transposed matrix corresponding to the second similarity matrix, and m and n being positive integers not greater than the quantity of the plurality of audio segments.

In a possible implementation, the determining module 501 is configured to: determine, according to a plurality of similarities included in each row of the third similarity matrix, a maximum similarity corresponding to each row;

and divide a plurality of similarities included in each row of the third similarity matrix by the maximum similarity corresponding to each row to obtain the fourth similarity matrix.

In a possible implementation, the determining module 501 is configured to: determine, according to the plurality of reference parameters and the similarity matrix corresponding to each reference parameter, a ratio value corresponding to each reference parameter, the ratio value being used for indicating a quantity of similarities remaining in the similarity matrix corresponding to the reference parameter; and determine the quantity of the audio objects in the plurality of audio segments according to the ratio value corresponding to each reference parameter.

In a possible implementation, the determining module 501 is configured to: for any one of the plurality of reference parameters, perform Laplace transform on a similarity matrix corresponding to the reference parameter to obtain a Laplace matrix corresponding to the reference parameter; perform singular value decomposition on the Laplace matrix to obtain a plurality of reference eigenvalues; determine a second eigenvalue and a first quantity of first eigenvalues in the plurality of reference eigenvalues, the second eigenvalue being a maximum value in the plurality of reference eigenvalues, and the first eigenvalue being a reference eigenvalue satisfying a second requirement after the plurality of reference eigenvalues being sorted according to a second order; determine a difference between two adjacent first eigenvalues in the first quantity of first eigenvalues to obtain a plurality of eigenvalue differences; perform normalization on a first eigenvalue difference according to the second eigenvalue to obtain a normalized eigenvalue difference, the first eigenvalue difference being a maximum eigenvalue difference in the plurality of eigenvalue difference; and determine, according to the normalized eigenvalue difference and the reference parameter, a ratio value corresponding to the reference parameter.

In a possible implementation, the determining module 501 is configured to: determine a first parameter in the plurality of reference parameters according to a ratio value corresponding to each reference parameter, the first parameter being a reference parameter corresponding to a minimum ratio value in the plurality of reference parameters; determine a plurality of eigenvalue differences corresponding to the first parameter; and call a first function to process the plurality of eigenvalue differences corresponding to the first parameter to obtain the quantity of the audio objects in the plurality of audio segments.

In a possible implementation, the clustering module 503 is configured to: perform singular value decomposition on a similarity matrix corresponding to the first parameter to obtain a plurality of decomposition eigenvalues; determine an audio object quantity of decomposition eigenvalues in the plurality of decomposition eigenvalues; determine an eigenvector corresponding to each of the audio object quantity of decomposition eigenvalues, and generate a decomposition matrix, a quantity of rows of the decomposition matrix being the quantity of the audio objects, and a quantity of columns being the quantity of the audio segments; determine, according to the decomposition matrix, an eigenvector corresponding to each of the plurality of audio segments, the eigenvector being used for indicating a corresponding audio segment; and cluster the plurality of audio segments according to the quantity of the audio objects and the eigenvector corresponding to each of the plurality of audio segments to obtain the audio segment obtained by the sound production by each audio object.

According to the foregoing apparatus, an initial similarity matrix is adjusted according to a dynamic threshold corresponding to each row of an initial similarity matrix to obtain a reference similarity matrix. In this way, through a dynamic threshold adjustment process, similarities between voiceprint vectors of audio segments of a same audio object increase and similarities between voiceprint vectors of audio segments of different audio objects decrease, so that a quantity of audio objects determined according to the reference similarity matrix is more accurate. In addition, a plurality of audio segments are clustered according to the quantity of the audio objects with higher accuracy to obtain an audio segment corresponding to each audio object. In this way, accuracy of the determined audio segment corresponding to each audio object is higher, and accuracy of clustering the audio object is higher, so that an audio processing effect on the audio segment can be improved.

Figure 6:
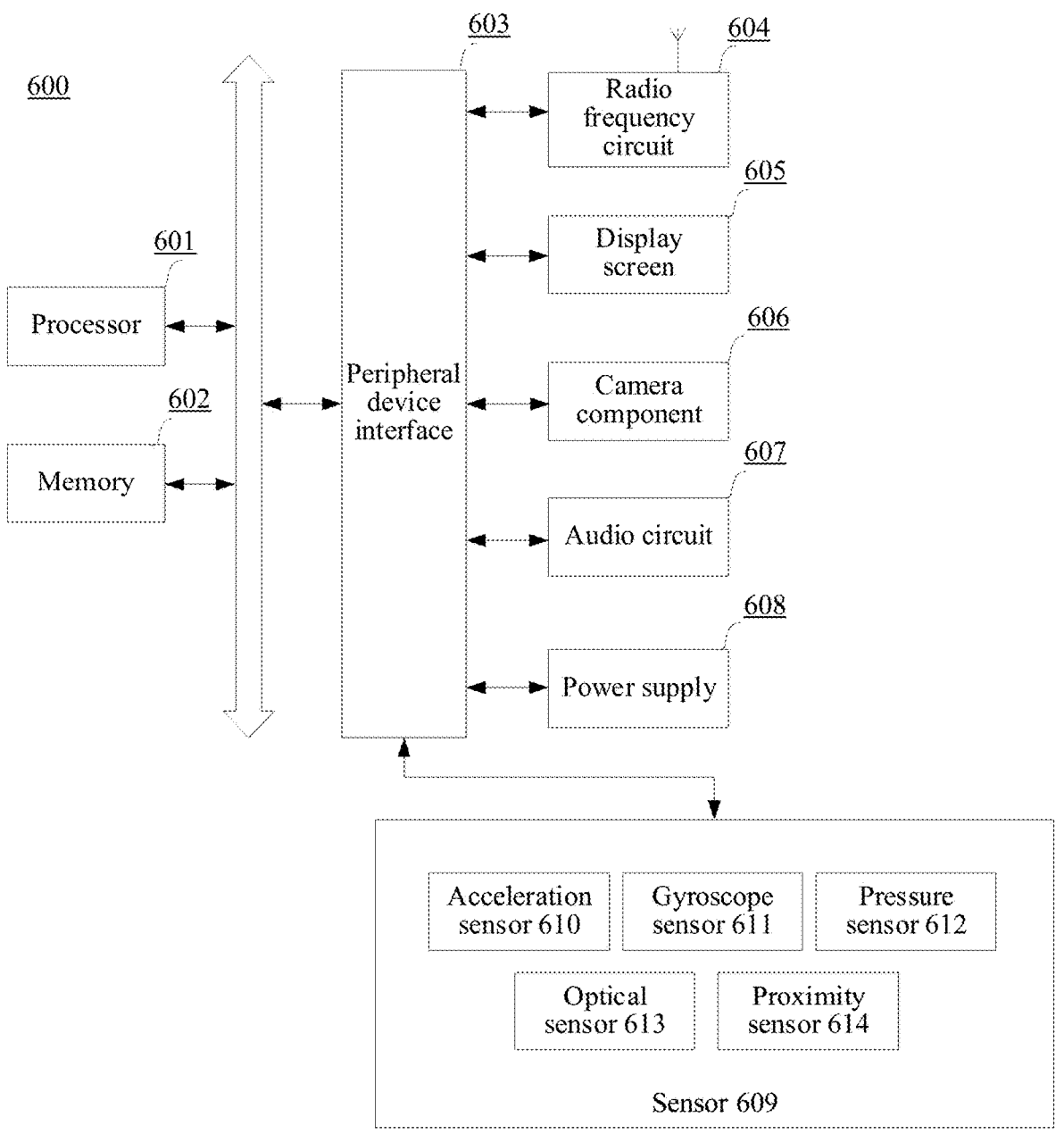
FIG. 6 is a schematic diagram of a structure of a terminal device according to an embodiment of this application.

FIG. 6 is a block diagram of a structure of a terminal device 600 according to an exemplary embodiment of this application. The terminal device 600 may be a portable mobile terminal, such as a smart phone, a tablet computer, a Moving Picture Experts Group Audio Layer III (MP3) player, a Moving Picture Experts Group Audio Layer IV (MP4) player, a laptop, or a desktop computer. The terminal device 600 may also be referred to as another name such as user equipment, a portable terminal, a laptop terminal, or a desktop terminal.

Generally, the terminal device 600 includes a processor 601 and a memory 602.

The processor 601 may include one or more processing cores, for example, a 4-core processor or an 8-core processor. The processor 601 may be implemented in at least one hardware form of digital signal processing (DSP), a field-programmable gate array (FPGA), and a programmable logic array (PLA). The processor 601 may alternatively include a main processor and a coprocessor. The main processor is a processor configured to process data in an awake state, and is also referred to as a central processing unit (CPU). The coprocessor is a low power consumption processor configured to process the data in a standby state. In some embodiments, the processor 601 may be integrated with a graphics processing unit (GPU). The GPU is configured to render and draw content that needs to be displayed on a display screen. In some embodiments, the processor 601 may further include an artificial intelligence (AI) processor. The AI processor is configured to process computing operations related to machine learning.

The memory 602 may include one or more computer-readable storage media. The computer-readable storage medium may be non-transitory. The memory 602 may further include a high-speed random access memory and a non-volatile memory, for example, one or more disk storage devices or flash storage devices. In some embodiments, the non-transitory computer-readable storage medium in the memory 602 is configured to store at least one instruction, and the at least one instruction, when executed by the processor 601, implements the audio processing method according to the embodiments of this application.

In some embodiments, the terminal device 600 may include a peripheral device interface 603 and at least one peripheral device. The processor 601, the memory 602, and the peripheral device interface 603 may be connected by a bus or a signal cable. Each peripheral device may be connected to the peripheral device interface 603 by a bus, a signal cable, or a circuit board. Specifically, the peripheral device includes at least one of a radio frequency circuit 604, a display screen 605, a camera component 606, an audio circuit 607, and a power supply 608.

The peripheral device interface 603 may be configured to connect at least one peripheral device related to input/output (I/O) to the processor 601 and the memory 602. In some embodiments, the processor 601, the memory 602, and the peripheral device interface 603 are integrated on a same chip or circuit board. In some other embodiments, any one or two of the processor 601, the memory 602, and the peripheral device interface 603 may be implemented on a single chip or circuit board, which is not limited in this embodiment.

The radio frequency circuit 604 is configured to receive and transmit a radio frequency (RF) signal, which is also referred to as an electromagnetic signal. The radio frequency circuit 604 communicates with a communication network and another communication device through the electromagnetic signal. The radio frequency circuit 604 converts an electrical signal into an electromagnetic signal for transmission, or converts a received electromagnetic signal into an electrical signal. In some embodiments, the radio frequency circuit 604 includes an antenna system, an RF transceiver, one or more amplifiers, a tuner, an oscillator, a digital signal processor, a codec chip set, a subscriber identity module card, and the like. The radio frequency circuit 604 may communicate with another terminal device by using at least one wireless communications protocol. The wireless communication protocol includes but is not limited to a world wide web, a metropolitan area network, an intranet, generations of mobile communication networks (2G, 3G, 4G, and 5G), a wireless local area network, and/or a wireless fidelity (Wi-Fi) network. In some embodiments, the radio frequency circuit 604 may further include a circuit related to near field communication (NFC), which is not limited in this application.

The display screen 605 is configured to display a user interface (UI). The UI may include a graph, text, an icon, a video, and any combination thereof. When the display screen 605 is a touch display screen, the display screen 605 also has the capability to collect a touch signal on or above a surface of the display screen 605. The touch signal may be inputted to the processor 601 as a control signal for processing. In this case, the display screen 605 may be further configured to provide a virtual button and/or a virtual keyboard, which is also referred to as a soft button and/or a soft keyboard. In some embodiments, there may be one display screen 605 disposed on a front panel of the terminal device 600. In some other embodiments, there may be at least two display screens 605 respectively disposed on different surfaces of the terminal device 600 or designed in a foldable shape. In some other embodiments, the display screen 605 may be a flexible display screen disposed on a curved surface or a folded surface of the terminal device 600. Even, the display screen 605 may be further configured in a non-rectangular irregular pattern, namely, a special-shaped screen. The display screen 605 may be prepared by using materials such as a liquid crystal display (LCD), an organic light-emitting diode (OLED), or the like.

The camera component 606 is configured to capture images or videos. In some embodiments, the camera component 606 includes a front-facing camera and a rear-facing camera. Generally, the front-facing camera is disposed on a front panel of the terminal device 600, and the rear-facing camera is disposed on a back surface of the terminal device 600. In some embodiments, there are at least two rear-facing cameras, which are respectively any of a main camera, a depth-of-field camera, a wide-angle camera, and a telephoto camera, to achieve background blur through fusion of the main camera and the depth-of-field camera, panoramic photographing and virtual reality (VR) photographing through fusion of the main camera and the wide-angle camera, or other fusion photographing functions. In some embodiments, the camera component 606 may further include a flash. The flash may be a monochrome temperature flash, or may be a double color temperature flash. The double color temperature flash refers to a combination of a warm light flash and a cold light flash, and may be used for light compensation under different color temperatures.

The audio circuit 607 may include a microphone and a speaker. The microphone is configured to acquire sound waves of a user and an environment, and convert the sound waves into an electrical signal to input to the processor 601 for processing, or input to the radio frequency circuit 604 for implementing voice communication. For a purpose of stereo acquisition or noise reduction, there may be a plurality of microphones disposed at different portions of the terminal device 600 respectively. The microphone may alternatively be an array microphone or an omni-directional acquisition type microphone. The speaker is configured to convert an electrical signal from the processor 601 or the radio frequency circuit 604 into acoustic waves. The speaker may be a conventional film speaker, or may be a piezoelectric ceramic speaker. When the speaker is a piezoelectric ceramic speaker, the speaker not only can convert an electrical signal into acoustic waves audible to a human being, but also can convert an electrical signal into acoustic waves inaudible to a human being, for ranging and other purposes. In some embodiments, the audio circuit 607 may further include an earphone jack.

The power supply 608 is configured to supply power to components in the terminal device 600. The power supply 608 may be an alternating current, a direct current, a primary battery, or a rechargeable battery. When the power supply 608 includes a rechargeable battery, the rechargeable battery may be a wired rechargeable battery or a wireless rechargeable battery. The wired rechargeable battery is a battery charged through a wired circuit, and the wireless rechargeable battery is a battery charged through a wireless coil. The rechargeable battery may be further configured to support a fast charging technology.

In some embodiments, the terminal device 600 further includes one or more sensors 609. The one or more sensors 609 include but are not limited to an acceleration sensor 610, a gyroscope sensor 611, a pressure sensor 612, an optical sensor 613, and a proximity sensor 614.

The acceleration sensor 610 may detect a magnitude of acceleration on three coordinate axes of a coordinate system established by the terminal device 600. For example, the acceleration sensor 610 may be configured to detect a component of gravity acceleration on the three coordinate axes. The processor 601 may control, according to a gravity acceleration signal acquired by the acceleration sensor 610, the display screen 605 to display the user interface in a horizontal-view mode or a vertical-view mode. The acceleration sensor 610 may be further configured to collect data of a game or a user movement.

The gyroscope sensor 611 may detect a body direction and a rotation angle of the terminal device 600. The gyroscope sensor 611 may cooperate with the acceleration sensor 610 to acquire 3D actions performed by a user on the terminal device 600. The processor 601 may implement the following functions according to the data collected by the gyroscope sensor 611: motion sensing (for example, changing the UI according to a tilt operation of the user), image stabilization during shooting, game control, and inertial navigation.

The pressure sensor 612 may be disposed on a side frame of the terminal device 600 and/or a lower layer of the display screen 605. When the pressure sensor 612 is disposed on the side frame of the terminal device 600, a holding signal of the user on the terminal device 600 may be detected. The processor 601 performs left and right hand recognition or a quick operation according to the holding signal acquired by the pressure sensor 612. When the pressure sensor 612 is disposed on the lower layer of the display screen 605, the processor 601 controls an operable control on the UI interface according to a pressure operation performed by the user on the display screen 605. The operable control includes at least one of a button control, a scroll-bar control, an icon control, and a menu control.

The optical sensor 613 is configured to acquire ambient light intensity. In an embodiment, the processor 601 may control the display brightness of the display screen 605 according to the ambient light intensity acquired by the optical sensor 613. Specifically, when the ambient light intensity is relatively high, the display brightness of the display screen 605 is increased. When the ambient light intensity is relatively low, the display brightness of the display screen 605 is decreased. In another embodiment, the processor 601 may further dynamically adjust a photographing parameter of the camera component 606 according to the ambient light intensity acquired by the optical sensor 613.

The proximity sensor 614, also referred to as a distance sensor, is generally disposed on the front panel of the terminal device 600. The proximity sensor 614 is configured to acquire a distance between the user and the front surface of the terminal device 600. In an embodiment, when the proximity sensor 614 detects that the distance between the user and the front surface of the terminal device 600 decreases gradually, the display screen 605 is controlled by the processor 601 to switch from a screen-on state to a screen-off state. When the proximity sensor 614 detects that the distance between the user and the front surface of the terminal device 600 increases gradually, the display screen 605 is controlled by the processor 601 to switch from a screen-off state to a screen-on state.

A person skilled in the art may understand that the structure shown in FIG. 6 does not constitute a limitation to the terminal device 600, and the terminal device 600 may include more or fewer components than those shown in the figure, or some components may be combined, or different component arrangements may be used.

Figure 7:
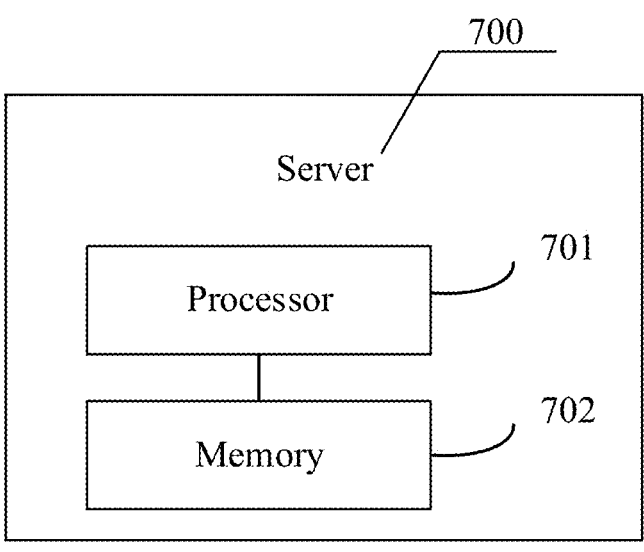
FIG. 7 is a schematic diagram of a structure of a server according to an embodiment of this application.

FIG. 7 is a schematic diagram of a structure of a server according to an embodiment of this application. The server 700 may vary a lot due to different configurations or performance, and may include one or more central processing units (CPUs) 701 and one or more memories 702. The one or more memories 702 have at least one program code stored therein. The at least one program code is loaded and executed by the one or more processors 701 to implement the audio processing method provided in the foregoing method embodiments. Certainly, the server 700 may further include components such as a wired or wireless network interface, a keyboard, and an input/output interface, to facilitate input and output. The server 700 may further include other components configured to implement device functions. Details are not further described herein.

In an exemplary embodiment, a non-transitory computer-readable storage medium is further provided, having at least one program code stored thereon, the at least one program code being loaded and executed by a processor to enable a computer to implement any one of the foregoing audio processing method.

In some embodiments, the computer-readable storage medium may be a read-only memory (ROM), a random access memory (RAM), a compact disc read-only memory (CD-ROM), a magnetic tape, a floppy disk, an optical data storage device, and the like.

In an exemplary embodiment, a computer program or a computer program product is further provided, having at least one computer instruction stored thereon, the at least one computer instruction being loaded and executed by a processor to enable a computer to implement any one of the foregoing audio processing method.

In this application, the term "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module can be implemented using one or more processors (or processors and memory). Likewise, a processor (or processors and memory) can be used to implement one or more modules. Moreover, each module can be part of an overall module that includes the functionalities of the module. Information (including but not limited to user device information, user personal information, and the like), data (including but not limited to data used for analysis, stored data, displayed data, and the like), and signals in this application are all authorized by a user or fully authorized by all parties, and collection, use, and processing of related data need to comply with relevant laws, regulations, and standards of relevant countries and regions. For example, the audio segments in this application are obtained under full authorization.

What is claimed is:

1. An audio processing method performed by a computer device, the method comprising:

obtaining a piece of voice data captured by a microphone of a terminal associated with a game account;

segmenting the piece of voice data into a plurality of audio segments;

determining a voiceprint vector corresponding to each of the plurality of audio segments, wherein each of the plurality of audio segments is generated by a respective audio object;

determining an initial similarity matrix according to the voiceprint vectors corresponding to the plurality of audio segments, each element in the initial similarity matrix comprising a similarity between voiceprint vectors corresponding to a respective pair of audio segments;

for a respective row of the initial similarity matrix, sorting similarities in the row according to an increasing order to obtain a first sorting result;

determining a similarity difference between two adjacent similarities in the first sorting result to obtain a plurality of similarity differences;

determining a maximum similarity difference in the plurality of similarity differences, the maximum similarity difference having a pair a minuend and a subtrahend;

determining the minuend of the maximum similarity difference as a dynamic threshold corresponding to the row;

adjusting the initial similarity matrix according to the dynamic threshold corresponding to each row of the initial similarity matrix to obtain a reference similarity matrix, further comprising:

setting a similarity in a $k^{th}$ row of the initial similarity matrix that is less than a dynamic threshold corresponding to the $k^{th}$ row to zero, k being a positive integer; and obtaining the reference similarity matrix based on an adjusted result of each row, k being a positive integer;

determining, according to the reference similarity matrix, a quantity of audio objects corresponding to the plurality of audio segments, wherein the quantity of audio objects is no greater than a quantity of the plurality of audio segments, further including:

for a respective reference parameter p of a plurality of reference parameters, p being a positive integer, calculating a first quantity of first eigenvalues for the reference parameter p;

determining a difference between two adjacent first eigenvalues of the first quantity of first eigenvalues to obtain a plurality of eigenvalue differences;

calculating a ratio value between the reference parameter p and a maximum of the plurality of eigenvalue differences;

determining the quantity of the audio objects in the plurality of audio segments as one of the plurality of reference parameters when its corresponding ratio value is minimized;

clustering the plurality of audio segments according to the quantity of the audio objects to obtain an audio segment corresponding to each audio object; and determining a unique user associated with the game account based on the audio segment corresponding to each audio object.

2. The method according to claim 1, wherein the adjusting the initial similarity matrix according to a dynamic threshold corresponding to each row of the initial similarity matrix to obtain a reference similarity matrix comprises:

multiplying a similarity that is in similarities comprised in a $k^{th}$ row of the initial similarity matrix and that is less than a dynamic threshold corresponding to the $k^{th}$ row by a second value, and obtaining the reference similarity matrix based on an adjusted result of each row.

3. The method according to claim 1, wherein each voiceprint vector represents a voiceprint feature corresponding to a respective audio segment.

4. The method according to claim 1, wherein the dynamic threshold is used for adjusting similarity differences between different voiceprint vectors corresponding to a respective pair of audio segments within the row of the initial similarity matrix.

5. A computer device, comprising a processor and a memory, the memory having at least one program code stored therein, and the at least one program code being loaded and executed by the processor to enable the computer device to implement an audio processing method including:

obtaining a piece of voice data captured by a microphone of a terminal associated with a game account;

segmenting the piece of voice data into a plurality of audio segments;

determining a voiceprint vector corresponding to each of the plurality of audio segments, wherein each of the plurality of audio segments is generated by a respective audio object;

determining an initial similarity matrix according to the voiceprint vectors corresponding to the plurality of audio segments, each element in the initial similarity matrix comprising a similarity between voiceprint vectors corresponding to a respective pair of audio segments;

for a respective row of the initial similarity matrix, sorting similarities in the row according to an increasing order to obtain a first sorting result;

determining a similarity difference between two adjacent similarities in the first sorting result to obtain a plurality of similarity differences;

determining a maximum similarity difference in the plurality of similarity differences, the maximum similarity difference having a pair a minuend and a subtrahend;

determining the minuend of the maximum similarity difference as a dynamic threshold corresponding to the row;

adjusting the initial similarity matrix according to the dynamic threshold corresponding to each row of the initial similarity matrix to obtain a reference similarity matrix, further comprising:

setting a similarity in a $k^{th}$ row of the initial similarity matrix that is less than a dynamic threshold corresponding to the $k^{th}$ row to zero, k being a positive integer; and obtaining the reference similarity matrix based on an adjusted result of each row, k being a positive integer;

determining, according to the reference similarity matrix, a quantity of audio objects corresponding to the plurality of audio segments, wherein the quantity of audio objects is no greater than a quantity of the plurality of audio segments, further including:

for a respective reference parameter p of a plurality of reference parameters, p being a positive integer, calculating a first quantity of first eigenvalues for the reference parameter p;

determining a difference between two adjacent first eigenvalues of the first quantity of first eigenvalues to obtain a plurality of eigenvalue differences;

calculating a ratio value between the reference parameter p and a maximum of the plurality of eigenvalue differences;

determining the quantity of the audio objects in the plurality of audio segments as one of the plurality of reference parameters when its corresponding ratio value is minimized;

clustering the plurality of audio segments according to the quantity of the audio objects to obtain an audio segment corresponding to each audio object; and determining a unique user associated with the game account based on the audio segment corresponding to each audio object.

6. The computer device according to claim 5, wherein the adjusting the initial similarity matrix according to a dynamic threshold corresponding to each row of the initial similarity matrix to obtain a reference similarity matrix comprises:

multiplying a similarity that is in similarities comprised in a $k^{th}$ row of the initial similarity matrix and that is less than a dynamic threshold corresponding to the $k^{th}$ row by a second value, and obtaining the reference similarity matrix based on an adjusted result of each row.

7. The computer device according to claim 5, wherein each voiceprint vector represents a voiceprint feature corresponding to a respective audio segment.

8. The computer device according to claim 5, wherein the dynamic threshold is used for adjusting similarity differences between different voiceprint vectors corresponding to a respective pair of audio segments within the row of the initial similarity matrix.

9. A non-transitory computer-readable storage medium, having at least one program code stored thereon, the at least one program code being loaded and executed by a processor of a computer device to cause the computer device to implement an audio processing method including:

obtaining a piece of voice data captured by a microphone of a terminal associated with a game account;

segmenting the piece of voice data into a plurality of audio segments;

determining a voiceprint vector corresponding to each of the plurality of audio segments, wherein each of the plurality of audio segments is generated by a respective audio object;

determining an initial similarity matrix according to the voiceprint vectors corresponding to the plurality of audio segments, each element in the initial similarity matrix comprising a similarity between voiceprint vectors corresponding to a respective pair of audio segments;

for a respective row of the initial similarity matrix, sorting similarities in the row according to an increasing order to a first order to obtain a first sorting result;

determining a similarity difference between two adjacent similarities in the first sorting result to obtain a plurality of similarity differences;

determining a maximum similarity difference in the plurality of similarity differences, the maximum similarity difference having a pair a minuend and a subtrahend;

determining the minuend of the maximum similarity difference as a dynamic threshold corresponding to the row;

adjusting the initial similarity matrix according to the dynamic threshold corresponding to each row of the initial similarity matrix to obtain a reference similarity matrix, further comprising:

setting a similarity in a $k^{th}$ row of the initial similarity matrix that is less than a dynamic threshold corresponding to the $k^{th}$ row to zero, k being a positive integer; and obtaining the reference similarity matrix based on an adjusted result of each row, k being a positive integer;

determining, according to the reference similarity matrix, a quantity of audio objects corresponding to the plurality of audio segments, wherein the quantity of audio objects is no greater than a quantity of the plurality of audio segments, further including:

for a respective reference parameter p of a plurality of reference parameters, p being a positive integer, calculating a first quantity of first eigenvalues for the reference parameter p;

determining a difference between two adjacent first eigenvalues of the first quantity of first eigenvalues to obtain a plurality of eigenvalue differences;

calculating a ratio value between the reference parameter p and a maximum of the plurality of eigenvalue differences;

determining the quantity of the audio objects in the plurality of audio segments as one of the plurality of reference parameters when its corresponding ratio value is minimized;

clustering the plurality of audio segments according to the quantity of the audio objects to obtain an audio segment corresponding to each audio object; and determining a unique user associated with the game account based on the audio segment corresponding to each audio object.

10. The non-transitory computer-readable storage medium according to claim 9, wherein the adjusting the initial similarity matrix according to a dynamic threshold corresponding to each row of the initial similarity matrix to obtain a reference similarity matrix comprises:

multiplying a similarity that is in similarities comprised in a $k^{th}$ row of the initial similarity matrix and that is less than a dynamic threshold corresponding to the $k^{th}$ row by a second value, and obtaining the reference similarity matrix based on an adjusted result of each row.

11. The non-transitory computer-readable storage medium according to claim 9, wherein the dynamic threshold is used for adjusting similarity differences between different voiceprint vectors corresponding to a respective pair of audio segments within the row of the initial similarity matrix.

* * * * *